US009529520B2

(12) United States Patent
Cha et al.

(10) Patent No.: US 9,529,520 B2
(45) Date of Patent: Dec. 27, 2016

(54) METHOD OF PROVIDING INFORMATION AND MOBILE TERMINAL THEREOF

(75) Inventors: Sang-ok Cha, Daegu (KR); Dong-woo Kim, Daegu (KR); Young-ri Kim, Suwon-si (KR); Ji-yeon Yoo, Yongin-si (KR); Ju-youn Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 13/592,530

(22) Filed: Aug. 23, 2012

(65) Prior Publication Data

US 2013/0227471 A1    Aug. 29, 2013

(30) Foreign Application Priority Data

Feb. 24, 2012    (KR) .................... 10-2012-0019176

(51) Int. Cl.
G06F 3/048    (2013.01)
G06F 3/0488    (2013.01)
G06F 9/44    (2006.01)
G06F 3/0484    (2013.01)
H04M 1/725    (2006.01)

(52) U.S. Cl.
CPC .......... *G06F 3/0488* (2013.01); *G06F 3/0484* (2013.01); *G06F 9/4406* (2013.01); *G06F 9/4416* (2013.01); *H04M 1/72522* (2013.01)

(58) Field of Classification Search
CPC ................. G06F 2203/04808; G06F 17/30265
USPC ........................................................ 715/769
See application file for complete search history.

(56) References Cited

U.S. PATENT DOCUMENTS

| 5,995,084 | A | 11/1999 | Chan et al. |
| 7,458,030 | B2 | 11/2008 | Kirn et al. |
| 7,671,845 | B2* | 3/2010 | Keely ................... G06F 1/1626 345/169 |
| 8,116,439 | B1* | 2/2012 | Runcie ...................... 379/88.12 |
| 8,279,174 | B2* | 10/2012 | Jee et al. ....................... 345/157 |
| 8,429,422 | B1* | 4/2013 | Hagan et al. ................. 713/190 |
| 8,554,897 | B2* | 10/2013 | Kim et al. .................... 709/223 |
| 8,572,034 | B2 | 10/2013 | Crienen et al. |
| 8,677,284 | B2* | 3/2014 | Aguilar ............... G06F 3/04815 715/830 |
| 9,116,601 | B2 | 8/2015 | Yang et al. |
| 2002/0038388 | A1 | 3/2002 | Netter |
| 2004/0201602 | A1 | 10/2004 | Mody et al. |

(Continued)

FOREIGN PATENT DOCUMENTS

| EP | 1 703 424 A2 | 3/2006 |
| EP | 2113830 A2 | 11/2009 |

(Continued)

*Primary Examiner* — William Bashore
*Assistant Examiner* — Nathan Shrewsbury
(74) *Attorney, Agent, or Firm* — Jefferson IP Law, LLP

(57) ABSTRACT

A method of providing information, performed by a mobile terminal, is provided. The method includes sensing a user's gesture requesting a panel, and causing the panel to appear from at least one from among a left side, a right side, and a bottom side of a screen and then displaying the panel on the screen, according to the user's gesture requesting the panel. The panel includes at least one from among a share panel including a list of identification information of one or more external devices, a capture panel including a list of capture data, and a recommending panel including recommend contents.

27 Claims, 19 Drawing Sheets

(56) References Cited

U.S. PATENT DOCUMENTS

| | | | |
|---|---|---|---|
| 2005/0273780 A1 | 12/2005 | Torvinen | |
| 2005/0283734 A1* | 12/2005 | Santoro | G06F 3/0481 715/765 |
| 2006/0010395 A1* | 1/2006 | Aaltonen | G06F 3/0482 715/779 |
| 2006/0161516 A1 | 7/2006 | Clarke et al. | |
| 2006/0206461 A1 | 9/2006 | Tsuchiya et al. | |
| 2006/0277489 A1* | 12/2006 | Maehiro | G06F 3/0485 715/786 |
| 2007/0036469 A1 | 2/2007 | Kim et al. | |
| 2007/0112926 A1 | 5/2007 | Brett et al. | |
| 2008/0005247 A9* | 1/2008 | Khoo | G06F 3/0482 709/206 |
| 2008/0052637 A1* | 2/2008 | Ben-Yoseph | G06F 3/0481 715/800 |
| 2008/0320078 A1* | 12/2008 | Feldman | G06F 17/30867 709/203 |
| 2009/0037849 A1 | 2/2009 | Immonen et al. | |
| 2009/0064020 A1* | 3/2009 | Morris | H04N 5/44543 715/765 |
| 2009/0064055 A1 | 3/2009 | Chaudhri et al. | |
| 2009/0094562 A1 | 4/2009 | Jeong et al. | |
| 2009/0228820 A1 | 9/2009 | Kim et al. | |
| 2009/0243998 A1 | 10/2009 | Wang | |
| 2009/0245747 A1* | 10/2009 | Beyabani | 386/46 |
| 2009/0254843 A1 | 10/2009 | Van Wie et al. | |
| 2009/0276701 A1 | 11/2009 | Nurmi | |
| 2009/0319911 A1* | 12/2009 | McCann | G06Q 10/107 715/752 |
| 2009/0327885 A1 | 12/2009 | Aoki et al. | |
| 2009/0327963 A1* | 12/2009 | Mouilleseaux | G06F 3/0482 715/834 |
| 2010/0001967 A1 | 1/2010 | Yoo | |
| 2010/0030578 A1* | 2/2010 | Siddique | G06Q 10/0637 705/3 |
| 2010/0070501 A1* | 3/2010 | Walsh et al. | 707/736 |
| 2010/0070899 A1* | 3/2010 | Hunt et al. | 715/769 |
| 2010/0156812 A1 | 6/2010 | Stallings et al. | |
| 2010/0162133 A1 | 6/2010 | Pascal et al. | |
| 2010/0164994 A1* | 7/2010 | Sugimoto | G09G 5/42 345/661 |
| 2010/0169766 A1* | 7/2010 | Duarte | G06F 3/04883 715/244 |
| 2010/0235313 A1* | 9/2010 | Rea | G06F 17/30265 706/52 |
| 2010/0287486 A1 | 11/2010 | Coddington | |
| 2010/0317410 A1* | 12/2010 | Song et al. | 455/566 |
| 2011/0065459 A1 | 3/2011 | Cheng et al. | |
| 2011/0067068 A1* | 3/2011 | Hunleth | G06F 3/017 725/52 |
| 2011/0078624 A1 | 3/2011 | Missig et al. | |
| 2011/0083111 A1* | 4/2011 | Forutanpour | G06F 1/1694 715/863 |
| 2011/0098061 A1* | 4/2011 | Yoon | 455/456.3 |
| 2011/0109561 A1 | 5/2011 | Lee et al. | |
| 2011/0161807 A1* | 6/2011 | Choi et al. | 715/255 |
| 2011/0179385 A1* | 7/2011 | Li | G06F 17/3082 715/810 |
| 2011/0184949 A1* | 7/2011 | Luo | G06F 17/30265 707/737 |
| 2011/0184953 A1* | 7/2011 | Joshi | G06F 17/30241 707/738 |
| 2011/0194750 A1 | 8/2011 | Nepomniachtchi | |
| 2011/0199313 A1* | 8/2011 | Tsai | 345/173 |
| 2011/0202582 A1* | 8/2011 | Kim | G06F 17/3087 707/827 |
| 2011/0202868 A1 | 8/2011 | Yang et al. | |
| 2011/0202879 A1* | 8/2011 | Stovicek et al. | 715/828 |
| 2011/0209097 A1* | 8/2011 | Hinckley et al. | 715/863 |
| 2011/0225539 A1* | 9/2011 | Lee et al. | 715/784 |
| 2011/0274373 A1* | 11/2011 | Chaudhury et al. | |
| 2011/0288863 A1* | 11/2011 | Rasmussen | 704/235 |
| 2011/0307778 A1 | 12/2011 | Tsai et al. | |
| 2012/0030586 A1* | 2/2012 | Ketkar | G06F 17/3089 715/751 |
| 2012/0054822 A1* | 3/2012 | Dvorak | G06F 1/1647 726/1 |
| 2012/0056832 A1* | 3/2012 | Miyazaki | G06F 3/04883 345/173 |
| 2012/0062599 A1* | 3/2012 | Machida | G06F 1/1643 345/655 |
| 2012/0072833 A1* | 3/2012 | Song et al. | 715/243 |
| 2012/0131519 A1* | 5/2012 | Jitkoff | 715/863 |
| 2012/0159334 A1* | 6/2012 | Messerly | G06F 9/543 715/733 |
| 2012/0159472 A1* | 6/2012 | Hong et al. | 717/178 |
| 2012/0180001 A1* | 7/2012 | Griffin | G06F 3/04883 715/863 |
| 2012/0204125 A1* | 8/2012 | Shia et al. | 715/773 |
| 2012/0209724 A1* | 8/2012 | Wayne | G06Q 50/01 705/14.72 |
| 2012/0235930 A1* | 9/2012 | Lazaridis et al. | 345/173 |
| 2012/0240054 A1* | 9/2012 | Webber | G06Q 10/107 715/752 |
| 2012/0254098 A1* | 10/2012 | Flinn et al. | 706/52 |
| 2012/0293440 A1* | 11/2012 | Hotelling et al. | 345/173 |
| 2012/0300086 A1* | 11/2012 | Miyashita | G06K 9/00597 348/207.1 |
| 2012/0304106 A1* | 11/2012 | Levee | G06F 3/0481 715/781 |
| 2013/0055089 A1* | 2/2013 | Gundotra et al. | 715/733 |
| 2013/0063338 A1* | 3/2013 | Ma | 345/156 |
| 2013/0073623 A1* | 3/2013 | Nguyen | H04N 21/23103 709/204 |
| 2013/0076964 A1* | 3/2013 | Sirpal et al. | 348/333.12 |
| 2013/0091439 A1* | 4/2013 | Sirpal et al. | 715/752 |
| 2013/0093781 A1* | 4/2013 | Suzuki | A61B 6/461 345/581 |
| 2013/0103814 A1* | 4/2013 | Carrasco | H04L 65/4092 709/223 |
| 2013/0104023 A1* | 4/2013 | Nielsen et al. | 715/233 |
| 2013/0104054 A1* | 4/2013 | Cao et al. | 715/753 |
| 2013/0111001 A1* | 5/2013 | Hamilton | H04L 41/04 709/223 |
| 2013/0120447 A1* | 5/2013 | Kim et al. | 345/629 |
| 2013/0145290 A1* | 6/2013 | Weber | G06F 3/04883 715/760 |
| 2013/0151611 A1* | 6/2013 | Graham | G06Q 50/01 709/204 |
| 2013/0165199 A1* | 6/2013 | Lemay et al. | 463/20 |
| 2013/0185106 A1* | 7/2013 | Donatone | G06Q 50/01 705/7.14 |
| 2013/0210489 A1* | 8/2013 | Jouin | 455/557 |
| 2013/0275899 A1* | 10/2013 | Schubert et al. | 715/765 |
| 2014/0039895 A1* | 2/2014 | Aravamudan et al. | 704/257 |

FOREIGN PATENT DOCUMENTS

| | | |
|---|---|---|
| KR | 10-2006-0107901 A | 10/2006 |
| KR | 10-2006-0133430 A | 12/2006 |
| KR | 10-2010-0006650 A | 1/2010 |
| KR | 10-2010-0092712 A | 8/2010 |
| KR | 10-2011-0037064 A | 4/2011 |
| KR | 10-2011-0049328 A | 5/2011 |
| KR | 10-2011-0093554 A | 8/2011 |
| KR | 10-2011-0122004 A | 9/2011 |
| RU | 2404450 C2 | 6/2007 |
| RU | 2402068 C2 | 6/2008 |
| RU | 2411685 C2 | 1/2010 |
| RU | 2 403 614 C2 | 11/2010 |
| WO | 2009/118446 A1 | 10/2009 |
| WO | 2009-133234 A1 | 11/2009 |

* cited by examiner

FIG. 8
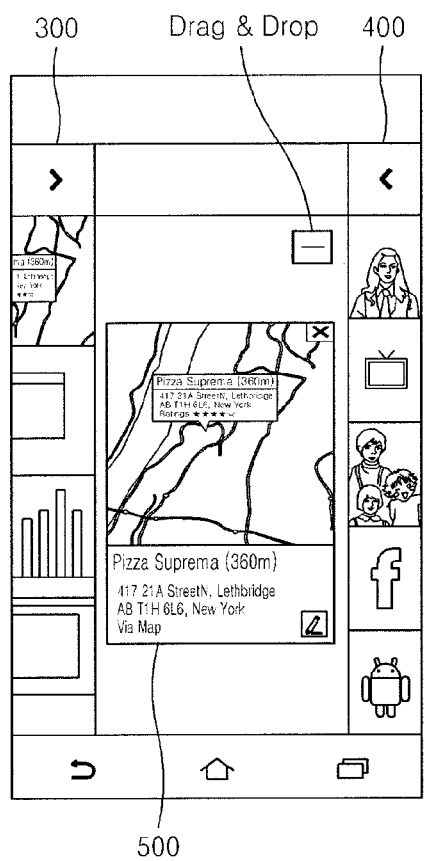
(a)
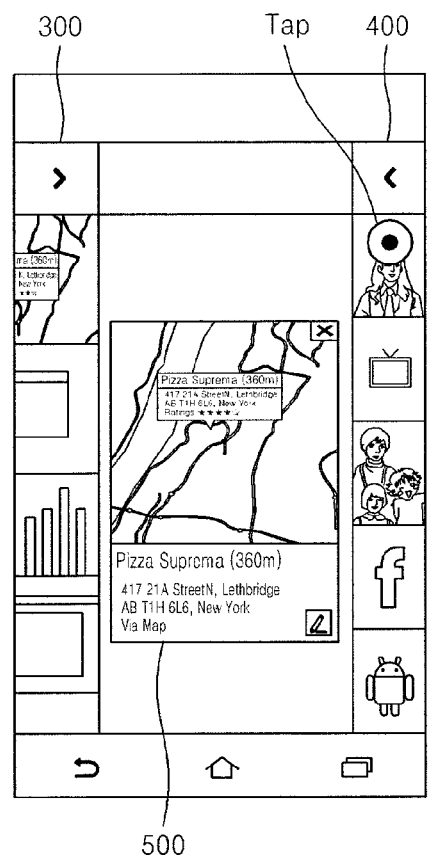
(b)

(a)                  (b)

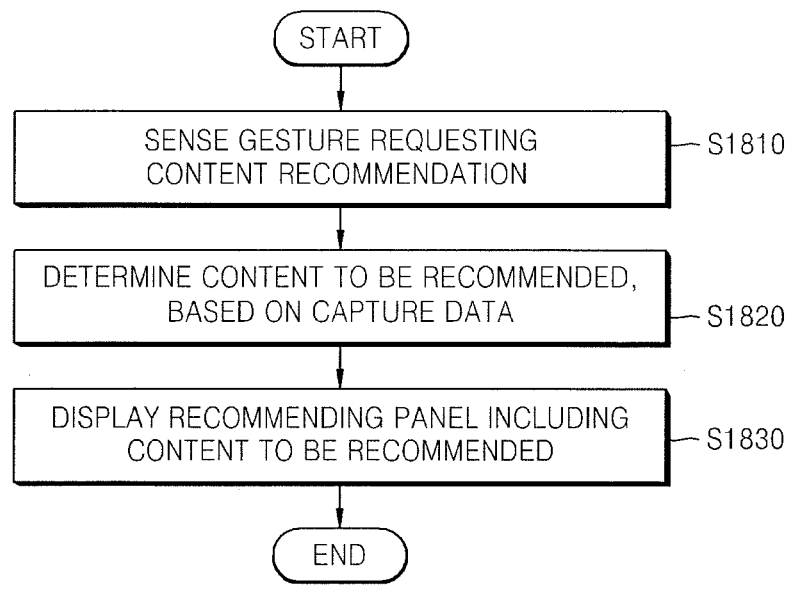
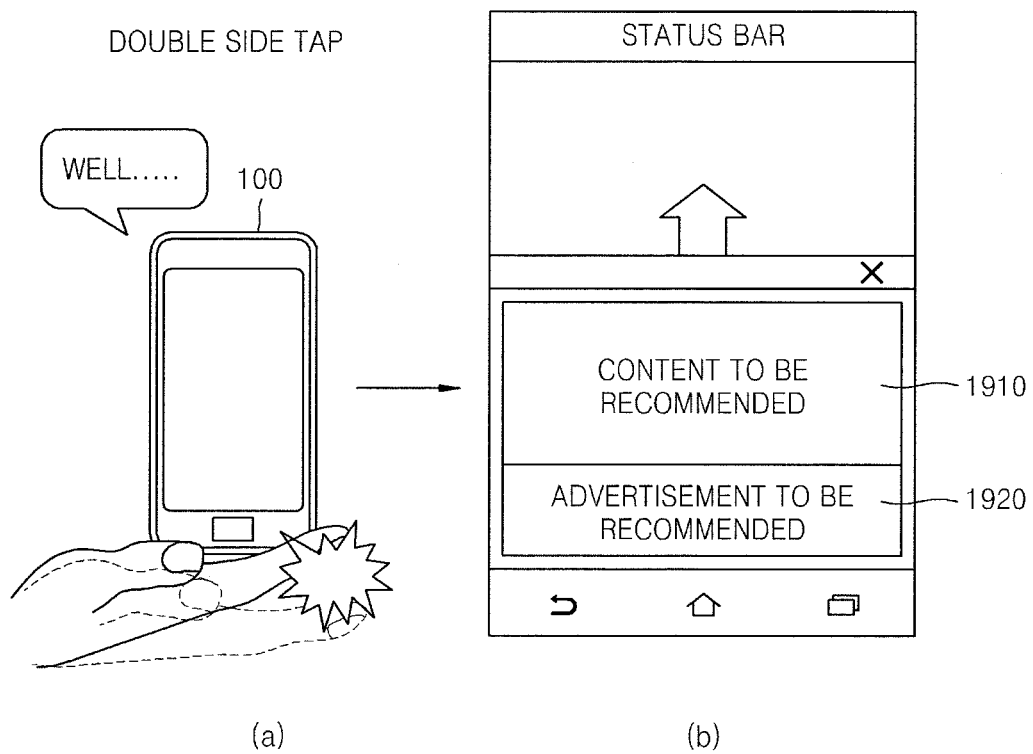

METHOD OF PROVIDING INFORMATION AND MOBILE TERMINAL THEREOF

PRIORITY

This application claims the benefit under 35 U.S.C. §119 (a) of a Korean patent application filed on Feb. 24, 2012 in the Korean Intellectual Property Office and assigned Serial No. 10-2012-0019176, the entire disclosure of which is hereby incorporated by reference.

BACKGROUND OF THE INVENTION

1. Field of the Invention

The present invention relates to a method of providing information, and a mobile terminal thereof. More particularly, the present invention relates to a method of providing information by sensing a user's simple gesture, and a mobile terminal thereof.

2. Description of the Related Art

Mobile terminals may be constructed to perform various functions. Examples of various functions include establishing data/voice communication, capturing a photo or a motion picture by using a camera, storing a voice signal, reproducing a music file by using a speaker system, displaying an image or video, and so on.

Some mobile terminals may further include a function of playing games and some mobile terminals may be embodied as multimedia devices. Furthermore, mobile terminals that have recently been developed are capable of receiving a broadcast or multicast signal to allow a user to view video or a television program.

Also, as users hold their respective mobile terminals for a relatively long period of time, a large amount of personal information of each of the users may be accumulated in the mobile terminal thereof. Thus, there is a need to develop a mobile terminal capable of effectively accumulating personal information of a user and providing various functions to the user based on the accumulated personal information in a user-convenient way.

SUMMARY OF THE INVENTION

Aspects of the present invention are to address at least the above-mentioned problems and/or disadvantages and to provide at least the advantages described below. In accordance with an aspect of the present invention a method of providing information, performed by a mobile terminal, is provided. The method includes sensing a user's gesture requesting a panel, and causing the panel to appear from at least one from among a left side, a right side, and a bottom side of a screen and then displaying the panel on the screen, according to the user's gesture requesting the panel. The panel includes at least one from among a share panel including a list of identification information of one or more external devices, a capture panel including a list of capture data, and a recommending panel including recommend contents.

The sensing of the user's gesture requesting the panel may include sensing a gesture of tapping a predetermined region of the screen a predetermined number of times or recognizing a preset syllable.

The sensing of the user's gesture requesting the panel may include sensing a user's gesture requesting content recommendation. The displaying of the panel may include determining content to be recommended, based on capture data including an image and metadata corresponding to content captured by the user, and displaying the recommending panel including the content to be recommended on the screen.

The capture data may include capture data corresponding to internal content to be reproduced in the mobile terminal, and capture data corresponding to external content from outside the mobile terminal.

The determining of the content to be recommended may include determining content to be recommended, in consideration of at least one from among usage pattern information about the mobile terminal, the user's profile information, the user's life pattern information, and situational information when the user's gesture requesting content recommendation is sensed.

The sensing of the user's gesture requesting content recommendation may include sensing a user's gesture of tapping a predetermined region of the mobile terminal a predetermined number of times.

The sensing of the user's gesture requesting content recommendation may include recognizing the user's voice, and when the user's voice is paused for a predetermined time period while the user's voice is recognized, the pause is sensed as the user's gesture requesting content recommendation.

The sensing of the user's gesture requesting content recommendation may include recognizing the user's voice, and sensing a word requesting content recommendation from among words included in the user's recognized voice.

The sensing of the user's gesture requesting content recommendation may include a user's gesture of flicking the screen toward the inside of the screen from at least one from among the left side, the right side, and the bottom side of the screen.

The situational information may include at least one from among information about content that is being reproduced when the user's gesture requesting content recommendation is sensed, location information of the mobile terminal when the user's gesture requesting content recommendation is sensed, time information when the user's gesture requesting content recommendation is sensed, and weather information when the user's gesture requesting content recommendation is sensed.

The recommending panel may appear upward from the bottom side of the screen.

The displaying the recommending panel including the content to be recommended on the screen may include displaying first content to be recommended in the recommending panel, sensing a gesture of flicking the recommending panel from a first point on the recommending panel to a second point on the recommending panel, and switching the first content to be recommended to second content to be recommended and displaying the second content to be recommended in the recommending panel, based on the gesture of the flicking.

The method may further include sensing a user's selection of the content to be recommended included in the recommending panel, and reproducing the content to be recommended corresponding to the user's selection.

In accordance with another aspect of the present invention, a mobile terminal is provided. The mobile terminal includes a sensing unit for sensing a user's gesture requesting a panel, a display unit for causing the panel to appear from at least one from among a left side, a right side, and a bottom side of a screen and then for displaying the panel on the screen, according to the user's gesture requesting the panel, and a controller for controlling the sensing unit and the display unit. The panel includes at least one from among a share panel including a list of identification information of one or more external devices, a capture panel including a list of capture data, and a recommending panel including recommend contents.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 illustrates screen images for sharing capture data, according to an exemplary embodiment of the present invention;

FIG. 18 is a flowchart illustrating a method of providing information by using a recommending panel, according to an exemplary embodiment of the present invention;

FIG. 19 is a diagram illustrating a gesture requesting content recommendation, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
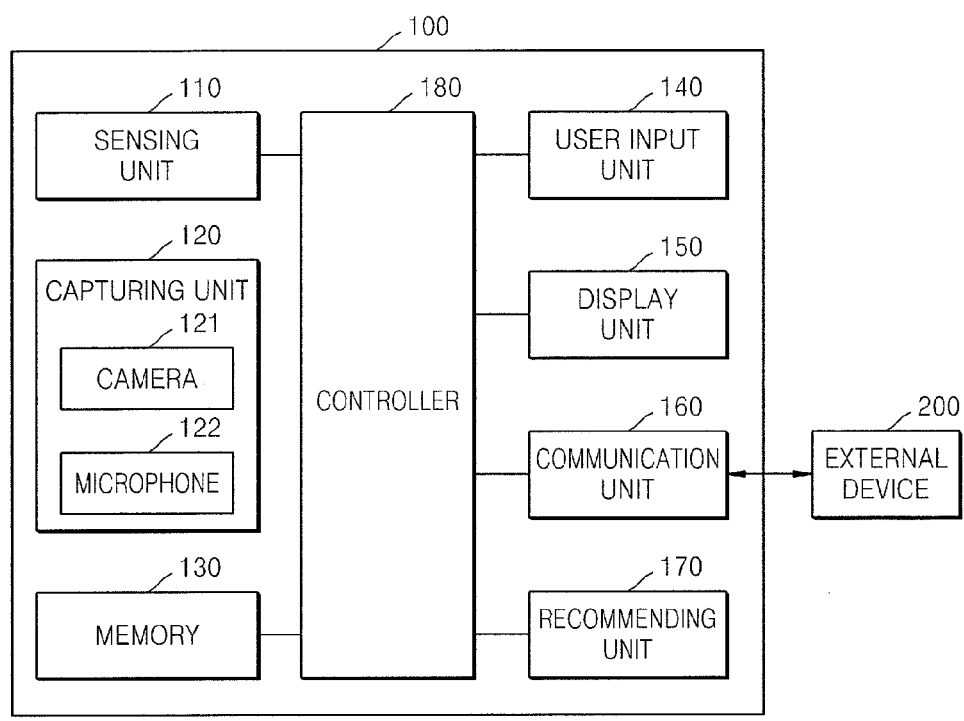
FIG. 1 is a block diagram of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

First, the terms used in the present disclosure will be briefly described below before exemplary embodiments of the present invention are described in greater detail.

Most of the terms used herein are general terms that have been widely used in the technical art to which the present disclosure pertains. However, some of the terms used herein may have been created to reflect the intentions of technicians in this art, precedents, or new technologies. Also, some of the terms used herein may have been arbitrarily chosen. In this case, these terms are defined in detail below. Accordingly, the specific terms used herein should be understood based on the unique meanings thereof and the whole context of the present disclosure.

In the present specification, it should be understood that the terms, such as 'include' or 'have,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Also, the terms, such as 'unit' or 'module', etc., should be understood as a unit that processes at least one function or operation and that may be embodied in a hardware manner, or a combination of the hardware manner and a software manner.

It is to be understood that the singular forms "a," "an," and "the" include plural referents unless the context clearly dictates otherwise. Thus, for example, reference to "a component surface" includes reference to one or more of such surfaces.

Throughout the present specification, the term 'object' means anything that a user can select. Examples of an object may include an icon, a link, a picture, a text, an index item, and so on. The term 'page' means a space containing content, information, or an object. For example, a page may be a web page, a list of contents, a list of thumbnails, a tray of photographs, a tray of icons, and so on.

Throughout the present specification, the term 'gesture' means, for example, a movement of a hand of a user to control a mobile terminal. Examples of a gesture described herein include tapping, touching and holding, double-tapping, dragging, panning, flicking, dragging and dropping, and so on.

The term 'tapping' may be understood as a user touching a screen with a finger or a stylus at very high speeds. In other words, the term 'tapping' means a case where a time period between when touch-in is done and when touch-out is done is very short. Touch-in means a user touching a screen with a finger or a stylus and touch-out means taking the finger or the stylus off from the screen.

The term 'touching and holding' means a user touching a screen with a finger or a stylus and maintaining the touching for a threshold period of time or longer. That is, the term 'touching and holding' means a case where a time period between when touch-in is done and when touch-out is done is equal to or greater than the threshold period of time. If a touch input is maintained for a threshold period of time or longer, a video or audio feedback signal may be provided to the user so that the user may determine whether the touch input is a tapping operation or a touch-and-hold operation.

The term 'double-tapping' means a user touching a screen twice at high speeds by using a finger or a stylus.

The term 'dragging' means a user touching a point on a screen with a finger or a stylus and moving the finger or the stylus to another point on the screen while maintaining the touching. Dragging may be done to move an object or perform panning.

The term 'panning' means performing dragging without selecting an object. Since no object is selected while panning is done, panning is performed to move a page within a screen or move an object group within a page, rather than to move an object within a page.

The term 'flicking' means a user performing dragging at high speeds by using a finger or a stylus. Dragging (or panning) and flicking may be differentiated from each other, based on whether a moving speed of the finger or the stylus is equal to or greater than a threshold speed.

The term 'dragging and dropping' means a user dragging an object to a desired location on a screen by using a finger or a stylus and then taking the finger or the stylus off from the screen so as to drop the object at a location corresponding to where the finger or stylus is taken off the screen.

Hereinafter, exemplary embodiments of the present invention will be described in greater detail with reference to the accompanying drawings so that those of ordinary skill in the art can easily accomplish embodiments of the present invention. The present invention may, however, be embodied in many different forms and should not be construed as being limited to the exemplary embodiments set forth herein. In the following description, well-known functions or constructions are not described in detail if it is determined that they would obscure the invention due to unnecessary detail. Throughout the drawings, whenever the same element reappears in a subsequent drawing, it is denoted by the same reference numeral.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a mobile terminal according to an exemplary embodiment of the present invention. The mobile terminal 100 may be embodied in any of various shapes. Examples of the mobile terminal 100 may include a mobile phone, a smartphone, a notebook computer, a digital broadcasting terminal, a Personal Digital Assistant (PDA), a Portable Multimedia Player (PMP), a navigation device, a tablet Personal Computer (PC), and the like.

Referring to FIG. 1, the mobile terminal 100 may include a sensing unit 110, a capturing unit 120, a memory 130, a user input unit 140, a display unit 150, a communication unit 160, a recommending unit 170, and a controller 180, but the present invention is not limited thereto. The mobile terminal 100 may further include other elements or may include only some of the elements illustrated in FIG. 1.

The elements of the mobile terminal 100 illustrated in FIG. 1 will now be described.

The sensing unit 110 senses a current state of the mobile terminal 100, e.g., the location of the mobile terminal 100, whether a user touches the mobile terminal 100 or not, the orientation of the mobile terminal 100, and acceleration/deceleration of the mobile terminal 100, and then generates a sensing signal for controlling an operation of the mobile terminal 100.

According to an exemplary embodiment of the present invention, the sensing unit 110 may include any of various sensors to sense a touch on or near a touch screen, i.e., a real-touch or a proximity-touch. A tactile sensor is a type of sensor that senses a touch on or near a touch screen. The tactile sensor may sense a touch on a screen to a same degree or more precisely than the degree to which a human being can sense the touch. The tactile sensor is capable of sensing various information, e.g., the toughness of a contact surface, the hardness of an object to be touched, and the temperature of a point to be touched.

A proximity sensor is another example of a sensor that senses a touch near a touch screen.

The proximity sensor is a sensor that senses the presence of an object, which is accessing or is located near a predetermined detection surface, without any physical contact and by using the force of an electromagnetic field or infrared rays. Thus, the proximity sensor has a very long lifetime and may be used for various purposes, compared to the tactile sensor.

Examples of the proximity sensor include a transmissive photoelectric sensor, a direct reflective photoelectric sensor, a mirror reflective photoelectric sensor, a high-frequency oscillation proximity sensor, an electrostatic capacitive proximity sensor, a magnetic proximity sensor, an infrared proximity sensor, and so on.

Thus, the sensing unit 110 may sense a gesture or a pattern input by a user. For example, the unit 110 may sense a user's gesture, e.g., dragging, flicking, tapping, touching and holding, double-tapping, panning, or sweeping. In this case, the sensing unit 110 may sense, for example, a direction, speed, and movement length of a gesture.

The capturing unit 120 may capture at least one content according to a user's gesture requesting the mobile terminal 100 to capture at least one content. According to an exemplary embodiment of the present invention, content may be internal content or external content. The internal content means content to be reproduced in the mobile terminal 100, and the external content means content present outside the mobile terminal 100.

According to an exemplary embodiment of the present invention, content may be a still image, a moving image, sound, or the like. Thus, the capturing unit 120 according to an exemplary embodiment of the present invention may include a camera 121 and a microphone 122 to receive an audio signal or a video signal.

The camera 121 processes an image frame, e.g., a still image or a moving image, which is captured by an image sensor (not shown) in a video telecommunication mode or a shooting mode. The processed image frame may be displayed on the display unit 150.

The image frame processed by the camera 121 may be stored in the memory 130 or may be transmitted to the outside via the communication unit 160. At least two cameras 121 may be used according to a structure of the mobile terminal 100.

In a telecommunication mode, a recording mode, or a voice recognition mode, the microphone 122 receives an external audio signal and converts the audio signal into electrical audio data. The microphone 122 may use any of various noise removal algorithms to remove noise generated when an external audio signal is input to the microphone 122.

The capturing unit 120 may obtain capture data including an image and metadata corresponding to at least one content captured via the camera 121 or the microphone 122. In other words, the capturing unit 120 may collect an image and metadata corresponding to captured content from the memory 130 or an external server (not shown).

If captured content is a still image, an image corresponding to the captured content may be the captured content itself. If captured content is sound, e.g., music, an image corresponding to the captured content may be an image related to the captured content. According to an exemplary embodiment of the present invention, metadata may include, for example, additional information, recommended information, and link information related to captured content.

According to an exemplary embodiment of the present invention, the capturing unit 120 may produce an image and metadata corresponding to captured content in one format. For example, the capturing unit 120 may produce capture data in an EXchangable image file (Exif) format, an Extensible Metadata Platform from Adobe (XMP) format, or an International Press Telecommunications Council (IPTC) format.

The memory 130 may store programs to be processed or controlled by the controller 180, and may store input/output data, e.g., capture data, a phone book, a message, a still image, or a moving picture.

The memory 130 may include at least one storage medium from among a flash memory type storage medium, a hard disk type storage medium, a multimedia card micro type storage medium, a card type memory, e.g., a Secure Digital (SD) memory or an eXtreme Digital (XD) memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic disc, and an optical disc memory. Also, the mobile terminal 100 may perform web storage in the Internet, in addition to or as the memory 130.

The user input unit 140 generates input data for controlling an operation of the mobile terminal 100. The user input unit 140 may include a keypad, a dome switch, a touch pad, e.g., a constant pressure type/capacitive type touchpad, a jog wheel, a jog switch, HardWare (H/W) buttons. In particular, if the touch pad forms a layered structure together with the display unit 150, then the touch pad may be referred to as a touch screen.

The display unit 150 outputs and displays information processed by the mobile terminal 100. For example, the display unit 150 may display a User Interface (UI) and/or a Graphical User Interface (GUI) related to capture data captured by the capturing unit 120, a capture panel including a list of capture data, and a shared panel including a list of IDentification (ID) information of one or more external devices.

If the display unit 150 and the touch pad form a layered structure together to manufacture a touch screen as described above, the display unit 150 may be used as not only an output device but also an input device. The display unit 150 may include at least one from among a Liquid Crystal Display (LCD), a Thin Film Transistor-LCD (TFT-LCD), an Organic Light-Emitting Diode (OLED), a flexible display, and a 3-Dimensional (3D) display. Also, at least two display units 150 may be used according to a structure of the mobile terminal 100. The touch screen may be constructed to sense a location of a touch input, a touched area, and a touched pressure. Also, the touch screen may be constructed to sense not only a real-touch but also a proximity touch.

In the present specification, the term 'real-touch' means a case where a pointer actually touches a screen, and the term 'proximity-touch' means a case where a pointer does not actually touch a screen but approaches the screen within a predetermined distance from the screen. In the present specification, the term 'pointer' means a tool for touching a particular location on or near a screen. Examples of the pointer include a stylus pen and a finger of a user.

The communication unit 160 may include at least one element for communicating the mobile terminal 100 with an external device 200. For example, the communication unit 160 may include a broadcast receiving module, a mobile telecommunication module, a wireless internet module, a wired internet module, a short-range wireless communication module, a location information module, and so on.

The broadcast receiving module receives a broadcast signal and/or information related to broadcasting from an external broadcasting management server (not shown) via a broadcast channel. The broadcast channel may be a satellite channel, a terrestrial broadcast channel, or the like.

The mobile telecommunication module exchanges a radio signal with at least one from among a base station, an external terminal, and a server via a mobile telecommunication network. Examples of the radio signal may include a voice call signal, a video communication call signal, and various types of data needed to exchange a message/multimedia message.

The wireless internet module is a module for accessing the Internet in a wireless manner. The wireless internet module may be installed inside or outside the communication unit 160. The wired internet module is a module for accessing the Internet in a wired manner.

The short-range wireless communication module is a module for establishing a short-range wireless communication. Examples of short-range wireless communication technology may include Bluetooth, Radio Frequency Identification (RFID), Infrared Data Association (IrDA), Ultra WideBand (UWB), ZigBee, and Wi-Fi Direct (WFD), and Near Field Communication (NFC).

The location information module is a module for detecting the location of the mobile terminal 100 or obtaining location information of the mobile terminal 100. A Global Position System (GPS) module is an example of the location information module. The GPS module receives location information of the mobile terminal 100 from a plurality of satellites. Here, the location information may include coordinate information represented with a latitude and longitude.

The recommending unit 170 may determine content that is to be recommended, according to capture data. The recommending unit 170 may determine content to be recommended, according to at least one from among usage pattern information of the mobile terminal 100, user profile information, user life pattern information, and situational information when a gesture requesting content recommendation is sensed.

In other words, the recommending unit 170 may recommend content to a user according to situational information, in consideration of user basic information (e.g., sex, age, occupation, residence, etc.), circumstantial information (e.g., place, weather, a WiFi zone, etc.), device usage pattern information (e.g., a number of times an application is used, a number of times music is reproduced, a number of times a moving picture is reproduced, a frequency of use of a Social Networking Service (SNS), a contact pattern, etc.), user activity pattern information (e.g., a number of times the user exercises, etc.), user device information (e.g., types and number of devices belonging to the user, etc.), and capture data stored in a capture panel.

According to an exemplary embodiment of the present invention, the content to be recommended may be a still image, a moving image, music, advertisement content, or the like. According to an exemplary embodiment of the present invention, the recommending unit 170 may determine content to be recommended to a user, in association with a server (not shown) that stores user log information.

The controller 180 controls overall operations of the mobile terminal 100. For example, the controller 180 performs controlling and processing related to content capturing, voice telecommunication, data communication, video telecommunication, and the like. In other words, the controller 180 may control operations of the sensing unit 110, the capturing unit 120, the memory 130, the user input unit 140, the display unit 150, the communication unit 160, and the recommending unit 170.

The controller 180 may include a multimedia module (not shown) for reproducing multimedia content. The multimedia module may be included inside or outside the controller 180.

According to an exemplary embodiment of the present invention, the external device 200 means a device that may communicate with the mobile terminal 100. Examples of the external device 200 may include a mobile phone, a smart phone, a laptop computer, a digital broadcast terminal, a PDA, a PMP, a navigation device, a tablet PC, a digital camera, and a digital Consumer Electronics (CE) device. Examples of the digital CE device may include a Digital TeleVision (DTV), an Internet Protocol TV (IPTV), a refrigerator with a display device, an air conditioner with a display device, and a printer with a display device.

According to an exemplary embodiment of the present invention, the external device 200 may be a server device, e.g., an SNS server.

A method of capturing content by using the elements of the mobile terminal 100 will now be described below in detail with reference to FIG. 2.

Figure 2:
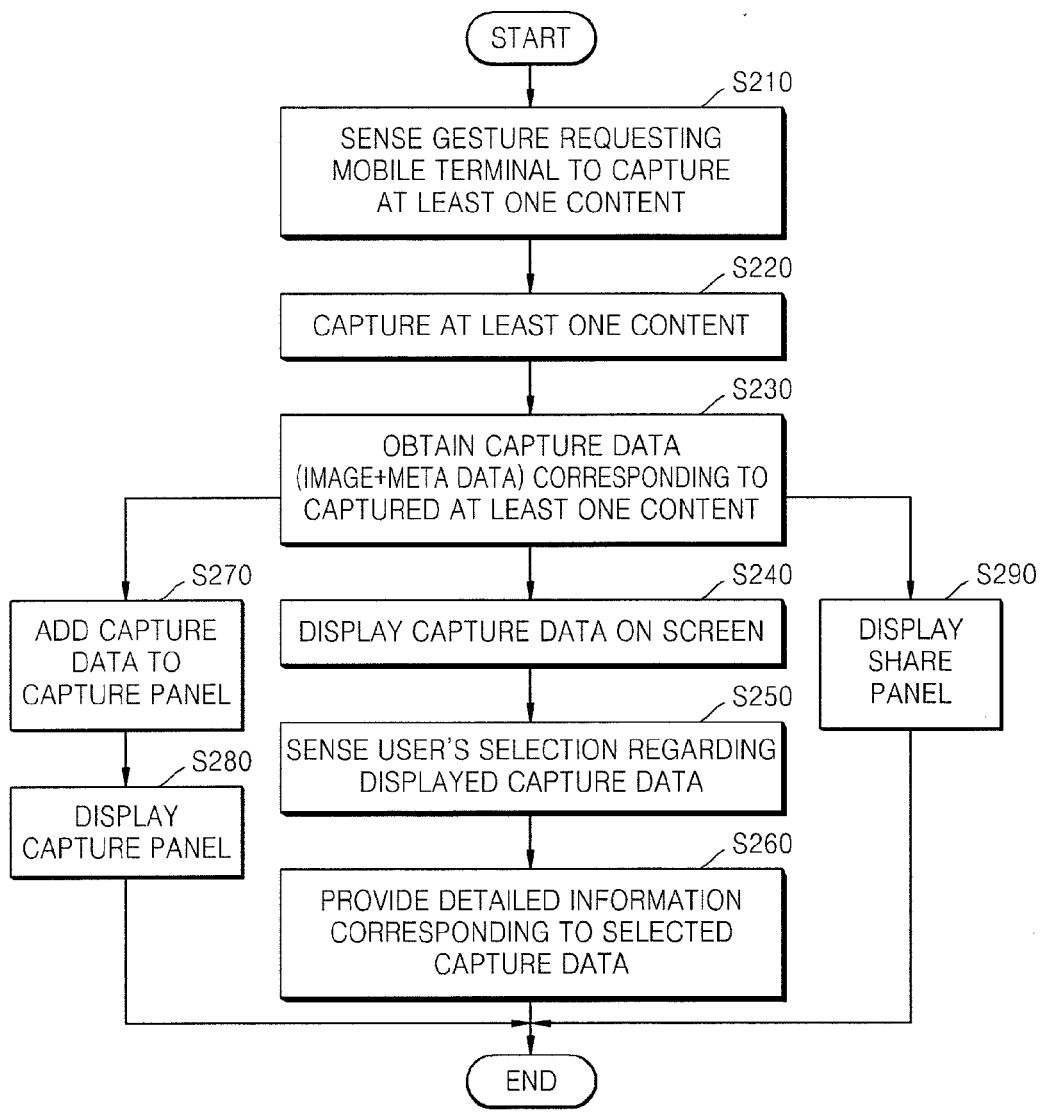
FIG. 2 is a flowchart illustrating a method of capturing content, according to an exemplary embodiment of the present invention.

FIG. 2 is a flowchart illustrating a method of capturing content, according to an exemplary embodiment of the present invention. The method of FIG. 2 includes operations that are sequentially performed by the elements of the mobile terminal 100 of FIG. 1. Thus, although not described here, the above description of the mobile terminal 100 may also be applied to the method of FIG. 2.

According to an exemplary embodiment of the present invention, the sensing unit 110 may, in operation S210, sense a user's gesture requesting the mobile terminal 100 to capture at least one content. According to an exemplary embodiment of the present invention, the gesture requesting the mobile terminal 100 to capture at least one content means a gesture including a user command regarding content capturing. The gesture requesting the mobile terminal 100 to capture at least one content may be preset. Examples of the gesture requesting the mobile terminal 100 to capture at least one content may include pressing a capture key, touching or tapping a predetermined region on a screen, shaking the mobile terminal 100, and so on. The sensing unit 110 may also sense a time period that this gesture is maintained or a number of times that this gesture is repeated.

According to an exemplary embodiment of the present invention, the capturing unit 120 may, in operation S220, capture at least one content, based on the gesture requesting the mobile terminal 100 to capture at least one content. According to an exemplary embodiment of the present invention, the capturing unit 120 may determine a type of content to be captured, based on a time period that this gesture is maintained or a number of times that this gesture is repeated. According to an exemplary embodiment of the present invention, examples of content may include internal content and external content.

The internal content means content reproduced in the mobile terminal 100. Examples of the internal content may include sound content that is being reproduced, e.g., music or voice content; moving picture content that is being reproduced, e.g., video content; and displayed still image content, e.g., book content, map content, document content, schedule content, or a web page.

The external content means content present outside the mobile terminal 100. Examples of the external content may include sound content, e.g., music or a voice signal that is being reproduced in another device; moving picture content, e.g., broadcast content, movie content, or advertisement image content; and still image content, e.g., a name card, a ticket, a book, a movie poster, a wine label, a 1-Dimensional (1D) barcode, a 2-Dimensional (2D) barcode, or a logo.

A method of determining a type of content to be captured, performed by the capturing unit 120 will now be described below in greater detail with reference to FIG. 3.

Figure 3:
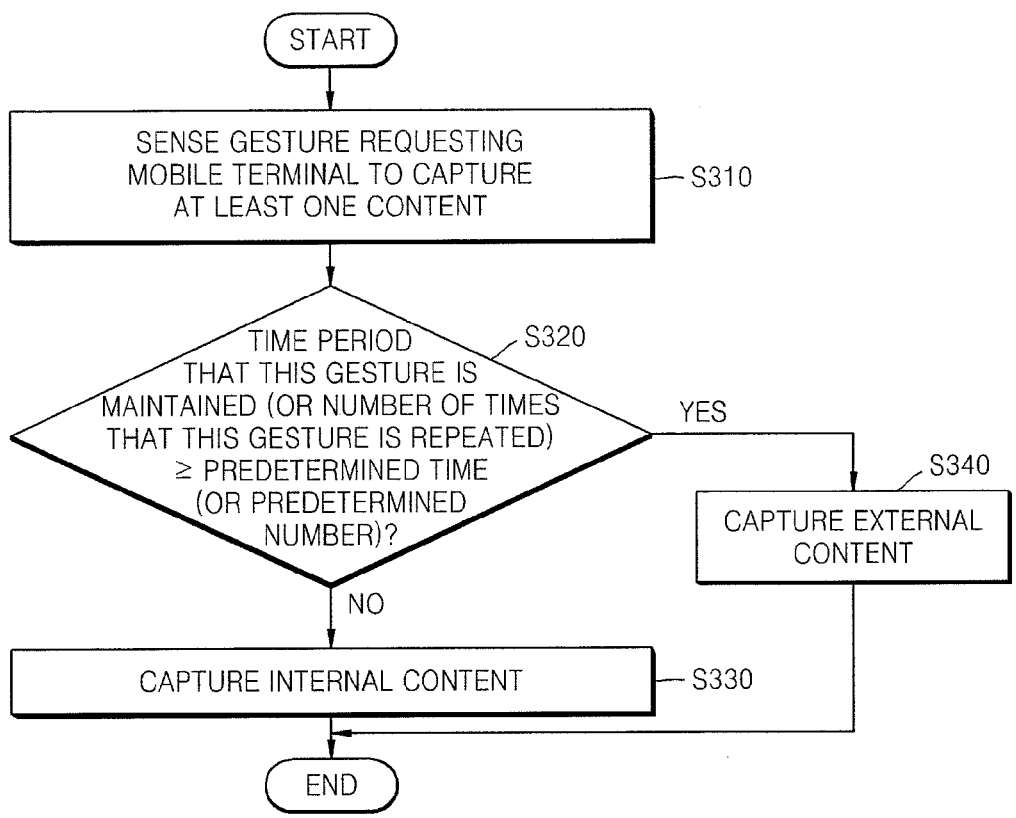
FIG. 3 is a flowchart illustrating a method of selecting a type of content to be captured, according to an exemplary embodiment of the present invention.

FIG. 3 is a flowchart illustrating a method of selecting a type of content to be captured, according to an exemplary embodiment of the present invention.

Referring to FIGS. 1 and 3, the sensing unit 110 may, in operation S310, sense a gesture requesting the mobile terminal 100 to capture at least one content. Then, the capturing unit 120 may, in operation S320, determine whether external content or internal content is to be captured, based on a time period that this gesture is maintained for or a number of times that this gesture is repeated, which is sensed by the sensing unit 110.

According to an exemplary embodiment of the present invention, the capturing unit 120 may, in operation S330, capture internal content when the time period that this gesture is maintained for is less than a predetermined time period, and may, in operation S340, capture external content when the time period that this gesture is maintained for is equal to or greater than the predetermined time period. For example, if the gesture requesting the mobile terminal 100 to capture at least one content is a gesture of pressing a capture key, then external content may be captured when a user presses the capture key for a predetermined time or longer, and internal content may be captured when the user presses the capture key for a time period less than the predetermined time. According to an exemplary embodiment of the present invention, the capture key may mean a hardware input, a predetermined region on a screen, or a predetermined bezel region.

Alternatively, the capturing unit 120 may capture external content when the time period that this gesture is maintained for is less than the predetermined time period and may capture internal content when the time period that this gesture is maintained for is equal to or greater than the predetermined time period.

According to another exemplary embodiment of the present invention, the capturing unit 120 may, in operation S330, capture internal content when the number of times that the gesture requesting the mobile terminal 100 to capture is repeated is less than a predetermined number, and may, in operation S340, capture external content when the number of times is equal to or greater than the predetermined number. For example, if the gesture requesting the mobile terminal 100 to capture at least one content is a gesture of tapping a predetermined region of the screen, then internal content may be captured when a user taps the predetermined region once and external content may be captured when the user taps the predetermined region twice.

Alternatively, the capturing unit 120 may capture external content when the number of times that the gesture requesting the mobile terminal 100 to capture at least one content is repeated is less than the predetermined number, and may capture internal content when the number of times is equal to or greater than the predetermined number.

Referring back to FIG. 2, the capturing unit 120 may, in operation S230, obtain capture data corresponding to the at least one captured content. In other words, according to an exemplary embodiment of the present invention, the capturing unit 120 may collect an image and metadata corresponding to the at least one captured content. In this case, the capturing unit 120 may collect an image and metadata corresponding to the at least one captured content, from the memory 130 or an external server (not shown).

If the at least one captured content is a still image, an image corresponding to the at least one captured content may be the at least one captured content itself. For example, when the capturing unit 120 captures a web page displayed on the mobile terminal 100, an image corresponding to the captured web page may be the web page itself.

If the at least one captured content is sound, e.g., music, an image corresponding to the at least one captured content may be an image related to the at least one captured content. For example, when the capturing unit 120 captures music content that is being reproduced in the mobile terminal 100 or at least one external device (not shown), an image corresponding to the captured music content may be a photo of an album jacket, an artist, or music video related to the music content. If the capturing unit 120 captures advertisement video, an image corresponding to the advertisement video may be an image of an advertised product. If the capturing unit 120 captures broadcast video, an image corresponding to the broadcast video may be a main image of a broadcast program.

According to an exemplary embodiment of the present invention, examples of metadata may include additional information, recommended information, and link information related to captured content. The additional information may include a time when the content is captured, a place where the content is captured, information related to the content, and so on. The recommended information means information about content recommended based on a correlation between the captured content and the recommended content and personal information of a user. The link information means content access information that allows the mobile terminal 100 to access the captured content. An example of the link information is a Uniform/Universal Resource Locator (URL).

For example, if captured content is music content to be reproduced in an external device, then metadata corresponding to the captured content may include a time when the content is captured, a place where the content is captured, the music title of the content, information about the artist thereof, other music content of the artist, recommended music content belonging to the same album, and access information about a streaming server that provides music sources.

If captured content is a book, metadata corresponding to the captured content may include the title of the book, the author thereof, a time when the content is captured, a place where the content is captured, a place where the book is sold, the address of a web page introducing reviews of the book, and information about another book of the author.

That is, when the capturing unit 120 transmits a captured content to an external server, the external server may collect metadata matching the captured content and transmit the collected metadata to the capturing unit 120.

If content captured by the capturing unit 120 is external content, at least two contents may be simultaneously captured. According to an exemplary embodiment of the present invention, the capturing unit 120 may simultaneously capture a still image content and a sound content by using the camera 121 and the microphone 122, respectively.

For example, when a user captures the label on a bottle of wine at a wine bar where music is being played, the capturing unit 120 may simultaneously capture the wine label and the music. In this case, the capturing unit 120 produces capture data for the wine label and capture data for the music.

The capturing unit 120 may obtain capture data related to the captured wine label, e.g., an image, the name, and the place of origin of the wine, the kind of grape, and an address for accessing a page where the wine can be purchased. Also, the capturing unit 120 may obtain capture data related to the captured music, e.g., the title of the music, the artist thereof, an address for accessing a site that provides a sound source, a time when the music is captured, and a place where the music is captured.

According to an exemplary embodiment of the present invention, the capturing unit 120 does not simply capture a screen image of content captured but may also capture metadata corresponding to the captured content, e.g., information about a situation of the mobile terminal 100 when the content is captured, additional information about the content, information related to the content, recommended information, and link information.

Then, the display unit 150 may, in operation S240, display the capture data in a predetermined region of the screen. In other words, the display unit 150 may display an image and metadata corresponding to the captured content in the predetermined region of the screen.

For example, if Cheom Seong Dae, which is a historic Korean astronomical observatory, is captured, metadata thereof, e.g., an image and description of Cheom Seong Dae, information about a place where it is captured, and information about a time when it is captured, may be displayed. If a movie poster is captured, metadata thereof, e.g., an image of the movie poster, the title of the movie shown in the movie poster, the director, the cast, a movie release date, and theaters where the movie is shown, may be displayed.

According to an exemplary embodiment of the present invention, the display unit 150 may display capture data in a central region on a screen. In this case, according to an exemplary embodiment of the present invention, the display unit 150 may display the capture data in a form of cards.

If a plurality of pieces of capture data are simultaneously captured, the display unit 150 may display all or only one of the plurality of pieces of capture data in a predetermined region on a screen.

According to an exemplary embodiment of the present invention, the display unit 150 may allow capture data to be automatically displayed in a predetermined region on a screen when the capture data is captured. In this case, a user may directly view an image and metadata corresponding to captured content when the content is captured.

The sensing unit 110 may, in operation S250, sense a user's selection of capture data from among the displayed capture data. For example, when a user taps the displayed capture data, the sensing unit 110 may sense the user's tapping.

Then, the controller 180 may, in operation S260, provide detailed information corresponding to the selected capture data, sensed by the sensing unit 110. The detailed information means information that is more informative than the displayed image and metadata regarding the at least one content. Thus, according to an exemplary embodiment of the present invention, the providing of the detailed information may include displaying a web page related to the at least one capture data, playing a music content related to the at least one capture data, or reproducing a moving picture related to the at least one capture data.

The controller 180 may select an application for providing the detailed information, based on the metadata of the at least one capture data. For example, if the selected capture data corresponds to music content, the controller 180 may select an application for reproducing a music file and reproduce the music file. If the selected capture data corresponds to game content, the controller 180 may execute a game application to provide a corresponding game service.

Then, the controller 180 may, in operation S270, add the capture data to a capture panel. The capture panel means a region for storing data captured by the mobile terminal 100. In the capture panel, a list of capture data may be displayed. According to an exemplary embodiment of the present invention, the capture panel may be a type of GUI.

According to an exemplary embodiment of the present invention, the controller 180 may arrange a list of pieces of capture data included in the capture panel, according to times when the pieces of capture data are respectively captured. For example, the controller 180 may arrange capture data corresponding to most recently captured content, in an uppermost region of the capture panel.

According to another exemplary embodiment of the present invention, the controller 180 may arrange a list of capture data included in a capture panel, based on content type. For example, the controller 180 may arrange a plurality of pieces of capture data included in the capture panel in such a manner that the plurality of pieces of capture data may be classified to correspond to still image content, sound content, and moving picture content, respectively.

Then, the display unit 150 may, in operation S280, display the capture panel to which the capture data is added. For example, when capture data is obtained, the display unit 150 may display the capture data in a first region of a screen, and display a capture panel to which the capture data is added, in a second region of the screen.

According to an exemplary embodiment of the present invention, the display unit 150 may display the entire capture panel or a part of the capture panel in the second region.

According to an exemplary embodiment of the present invention, a capture panel may include an image and metadata corresponding to each of captured contents. According to an exemplary embodiment of the present invention, a capture panel may additionally display an icon representing the type of content, as will be described below with reference to FIGS. 4 and 5.

Figure 4:
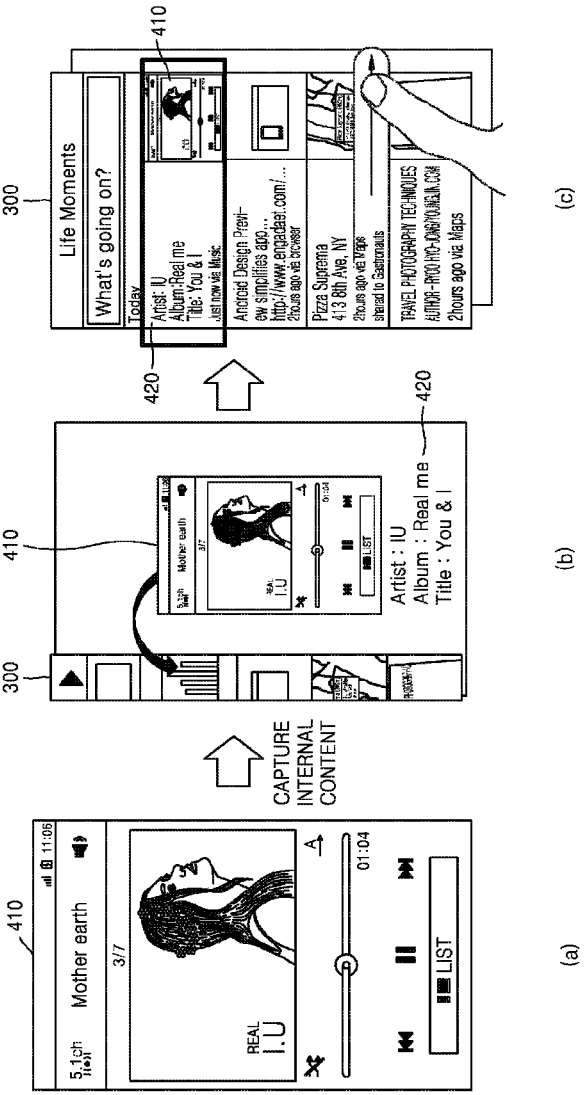
FIG. 4 is a diagram illustrating a method of capturing internal content, according to an exemplary embodiment of the present invention.

FIG. 4 is a diagram illustrating a method of capturing internal content, according to an exemplary embodiment of the present invention.

Referring to FIGS. 1 and 4, the sensing unit 110 may sense a user's gesture requesting the mobile terminal 100 to capture internal content. An example of this gesture may be pressing of a capture key for a predetermined time or longer.

Referring to FIG. 4(a), if a song of an artist 'IU' is being reproduced in the mobile terminal 100 and an album image of the artist 'IU' is displayed on the mobile terminal 100, then the capturing unit 120 may capture a screen image 410 displaying the album image and obtain metadata 420 related to this song from the memory 130 or an external server (not shown). The metadata 420 may be 'Artist: IU, Album name: Real me, Title: You & I, Capture time: 2012.3.1.'.

Referring to FIG. 4(b), the display unit 150 may display capture data including the screen image 410 and the metadata 420, in a first region of a screen thereof. According to an exemplary embodiment of the present invention, the capture data may be displayed in a central region of the screen in the form of cards. Thus, according to an exemplary embodiment of the present invention, a user may directly view an image and metadata related to captured content.

Also, when the capture data including the screen image 410 and the metadata 420 is captured, the controller 180 may add the capture data to a capture panel 300. In this case, according to an exemplary embodiment of the present invention, the capture data that is newly obtained may be added to an uppermost region of the capture panel 300. Also, the display unit 150 may display the capture panel 300 to which the capture data is added, at an edge region of the screen.

In other words, according to an exemplary embodiment of the present invention, when a user captures internal content, the display unit 150 may display newly produced capture data in a center region of the screen and display the entire capture panel 300 or a part of the capture panel 300 in an edge region of the screen. In this case, the user may check whether the newly produced capture data is stored in the capture panel 300.

Referring to FIG. 4(c), according to an exemplary embodiment of the present invention, the capture panel 300 may display an image and metadata corresponding to the captured content. In this case, according to an exemplary embodiment of the present invention, a list of capture data included in the capture panel 300 may be arranged according to time or content type.

When some of images included in the capture panel 300 are displayed, a user may touch and drag the capture panel 300 in an inward direction of the screen. Then, the display unit 150 may display all the images included in the capture panel 300. According to an exemplary embodiment of the present invention, the user may simultaneously view a plurality of pieces of capture data corresponding to contents captured by the user by using the list of capture data included in the capture panel 300.

Figure 5:
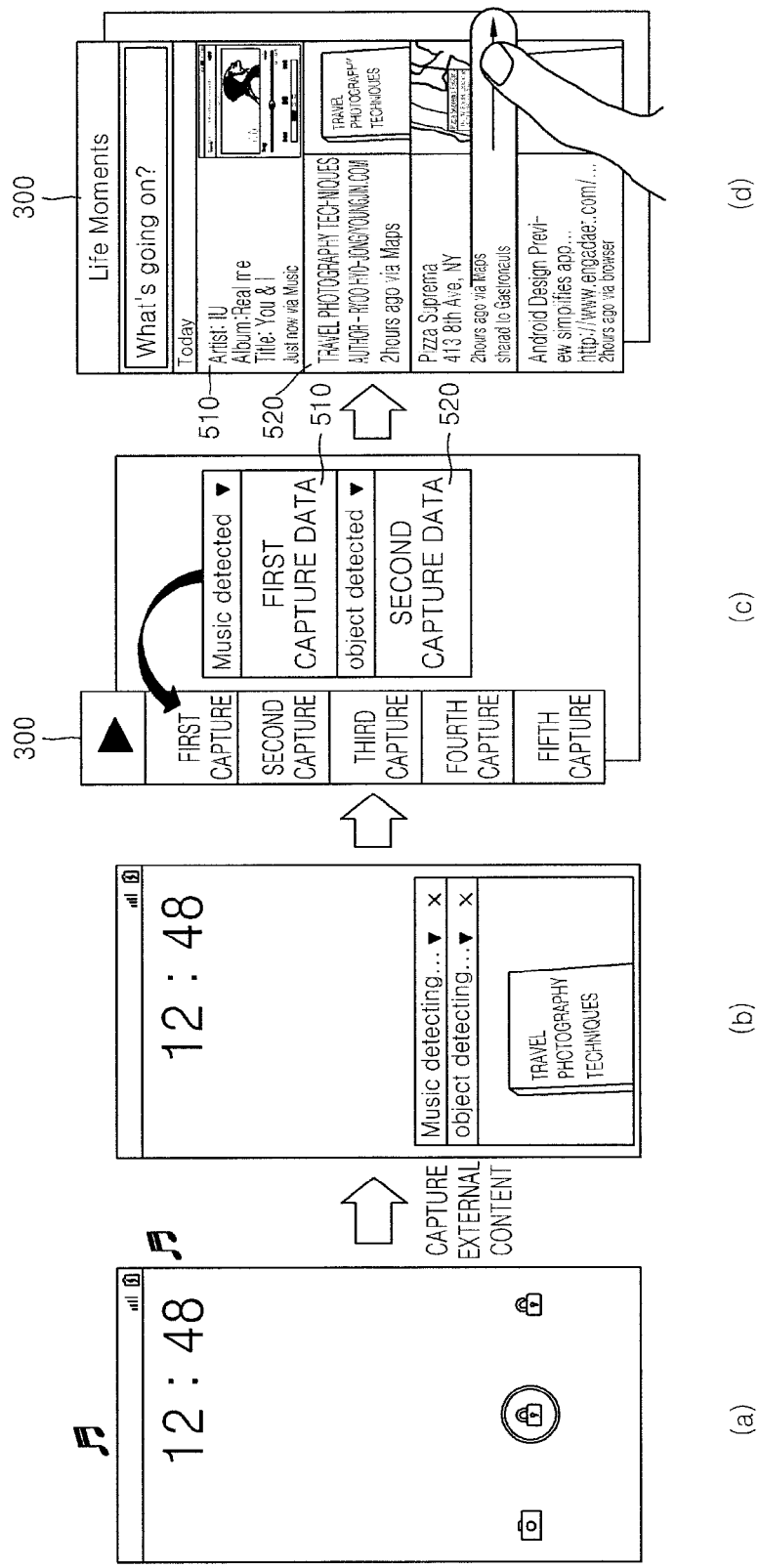
FIG. 5 is a diagram illustrating a method of capturing external content, according to an exemplary embodiment of the present invention.

FIG. 5 is a diagram illustrating a method of capturing external content, according to an exemplary embodiment of the present invention.

Referring to FIGS. 1 and 5, the sensing unit 110 may sense a user's gesture requesting external content to be captured. An example of this gesture may be pressing of a capture key for a predetermined period of time or longer.

Referring to FIG. 5(*a*), while looking around a bookstore where music is being played, a user may desire to capture a book. In this case, the user makes a gesture to capture external content, i.e., the book.

Referring to FIG. 5(*b*), the capturing unit 120 captures the external content according to the user's gesture. In this case, since music is being played in the bookstore, the capturing unit 120 may capture the music together with an image of the book.

Referring to FIG. 5(*c*), the capturing unit 120 may produce first capture data 510 including an image and metadata corresponding to the music, and second capture data 520 including an image and metadata corresponding to the book. The controller 180 may add the first capture data 510 and the second capture data 520 to a capture panel 300. The controller 180 may allow the first capture data 510 and the second capture data 520 to be automatically added to the capture panel 300 when the first capture data 510 and the second capture data 520 are captured, or may allow the first capture data 510 and the second capture data 520 to be added to the capture panel 300 when the user makes a gesture related thereto.

The display unit 150 may display at least one of the first capture data 510 and the second capture data 520 in a first region of the screen, and display the capture panel 300 in a second region of the screen.

Referring to FIG. 5(*d*), the first capture data 510 and the second capture data 520 captured by the user are stored in the capture panel 300. According to an exemplary embodiment of the present invention, if capture data added to the capture panel 300 is not desired capture data, the user may remove the capture data from the capture panel 300.

Referring back to FIG. 2, when the capture data is obtained, the display unit 150 may, in operation S290, display the capture data in the first region of the screen and display a share panel in the second region of the screen.

The share panel means an integrated communication panel displaying a list of ID information of one or more external devices to share data. When a user selects ID information of an external device from the list of ID information in the share panel, the communication unit 160 may communicate with the selected external device. According to an exemplary embodiment of the present invention, ID information of the one or more external devices may include user ID information, group ID information, and server ID information of the one or more external devices. Also, the share panel may include a list of telephone number directories and an SNS list. The SNS list means a list of ID information regarding users registered as acquaintances with an SNS server, as will be described in detail with reference to FIG. 6 below.

Figure 6:
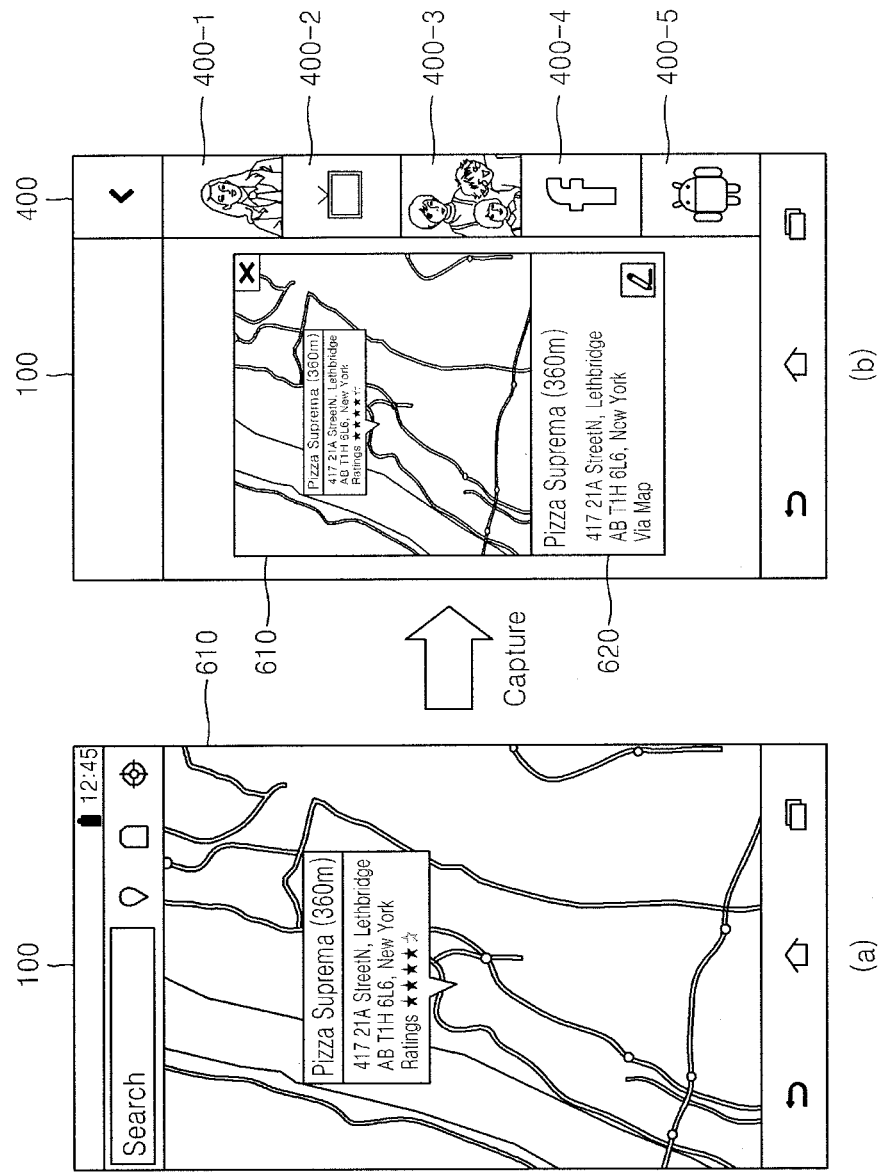
FIG. 6 is a screen image displaying a share panel when capture data is obtained, according to an exemplary embodiment of the present invention.

FIG. 6 is a screen image displaying a share panel when capture data is obtained, according to an exemplary embodiment of the present invention.

Referring to FIGS. 6(*a*) and 6(*b*), upon sensing a user's gesture requesting the mobile terminal 100 to capture at least one content, the mobile terminal 100 of FIG. 1 may capture a map image 610 while a map application is executing. In this case, the display unit 150 may display the captured map image 610 and metadata 620 related to the captured map image 610 in a first region of the screen, and display a share panel 400 in an edge region of the screen.

The share panel 400 may include user ID information 400-1, an identifier 400-2, group ID information 400-3, SNS server ID information 400-4, and agent ID information 400-5 of an external device.

The user ID information 400-1 may include profile images, telephone numbers, and IDs of friends of a user. The identifier 400-2 may include an image identifying a CE device, such as a smart TV or a table PC, or a device ID thereof. The group ID information 400-3 may include at least two pieces of user ID information, a group name, a group image, and the like.

The SNS server ID information 400-4 may include an image, an access address, and account information of an SNS server. The term 'social networking service (SNS)' means a service allowing a user to build a relationship with unspecified persons in an online environment. Users may build new relationships or strengthen the relationships with their acquaintances, via an SNS.

The controller 180 may arrange a list of ID information of at least one external device included in the share panel 400, based on at least one from among a communication time, a number of times that communication is established, and the distances between the mobile terminal 100 and the at least one external device. In other words, the controller 180 may arrange the ID information of the at least one external device, in such a manner that the ID information of an external device that has most recently communicated with the mobile terminal 100 may be made to appear first or the ID information of an external device that has most often communicated with the mobile terminal 100 may be made to appear first. Otherwise, the controller 180 may arrange the ID information of the at least one external device in such a manner that an external device most adjacent to the mobile terminal 100 may be made to appear first and an external device farthest from the mobile terminal 100 may be made to appear last.

Thus, a user may freely chat with, call, or broadcast information to another user or a user group, e.g., his/her family by using the share panel 400. Also, the user may directly transmit capture data to a server of an SNS, e.g., Facebook, or an external device, e.g., a TV, via the share panel 400.

For example, referring to FIGS. 6(*a*) and 6(*b*), according to an exemplary embodiment of the present invention, a user may capture a map image displaying the location of a restaurant, e.g., Pizza Suprema, and easily transmit the map image 610 and metadata 620 about Pizza Suprema, e.g., the name and address of the restaurant, information of a map application, a capture time, a place where the map image 610 was captured, etc.) to at least one external device included in the share panel 400.

According to an exemplary embodiment of the present invention, when capture data is obtained, the display unit 150 may display the capture data, a capture panel 300 to which the capture data is added, and the share panel 400 in first to third regions of the screen, respectively.

According to an exemplary embodiment of the present invention, the first region may be located within a predetermined distance from a center of the screen, the second region may be located at a side of the screen, and the third region may be located at another side of the screen, as will be described below in detail with reference to FIG. 7.

Figure 7:
FIG. 7 is a screen image displaying a capture panel and a share panel when capture data is obtained, according to an exemplary embodiment of the present invention.

FIG. 7 is a screen image displaying a capture panel and a share panel when capture data is obtained, according to an exemplary embodiment of the present invention.

Referring to FIGS. 1 and 7, the capturing unit 120 may capture a displayed map image according to a user's gesture requesting the mobile terminal 100 to capture at least one content, and obtain capture data corresponding to the map image by collecting metadata related to the map image.

In this case, the display unit 150 may display the capture data 500 including the map image and the metadata, in a central region of the screen. The display unit 150 may display the capture panel 300 on a left side of the screen and display the share panel 400 on a right side of the screen. However, the present invention is not limited thereto, and the locations of the capture data 500, the capture panel 300, and the share panel 400 are not limited.

A method of allowing a user to transmit capture data by using a share panel will now be described below in more detail with reference to FIG. 8.

FIG. 8 illustrates screen images for sharing capture data, according to an exemplary embodiment of the present invention. Referring to FIGS. 1 and 8(a), according to an exemplary embodiment of the present invention, capture data 500 obtained by the capturing unit 120 may be displayed in a first region of a screen, a share panel 400 may be displayed in a second region of the screen, and a capture panel 300 may be displayed in a third region of the screen. In this case, a user may drag the capture data 500 and drop it onto ID information of an external device included in the share panel 400.

In this case, the sensing unit 110 senses the drag-and-drop gesture performed from the first region to the second region. Then, the communication unit 160 transmits the capture data 500 to the external device corresponding to the location in the second region where the capture data 500 is dropped.

For example, a user A may capture a map image displaying the location of a desired restaurant and transmit the map image to a device of a user B in order to have lunch with the user B. In this case, when the user A captures the map image in the mobile terminal 100, the capturing unit 120 captures not only the map image but also metadata related to the map image. Then, the display unit 150 may display capture data including the map image and the metadata in the first region, and display the share panel 400 including ID information of the user B in the second region. In this case, when the user A drags the capture data and drops it onto the ID information of the user B in the share panel 400, the communication unit 160 transmits the capture data to the device of the user B. Since the capture data includes both the map image and the metadata, the user B may execute a map application used to capture data including the map image and the metadata by using the device of the user B.

Referring to FIG. 8(b), according to another exemplary embodiment of the present invention, when the capture data 500 and the share panel 400 are displayed on the screen, a user may transmit the capture data 500 to at least one external device included in the share panel 400 by tapping ID information of the at least one external device in the share panel 40.

For example, when the user A taps the ID information of the user B in the share panel 400, the sensing unit 110 senses the user's tapping gesture, and the communication unit 160 transmits capture data to the device of the user B corresponding to the sensed gesture.

A method of providing capture data by using the elements of the mobile terminal 100 of FIG. 1 will now be described below with reference to FIG. 9.

Figure 9:
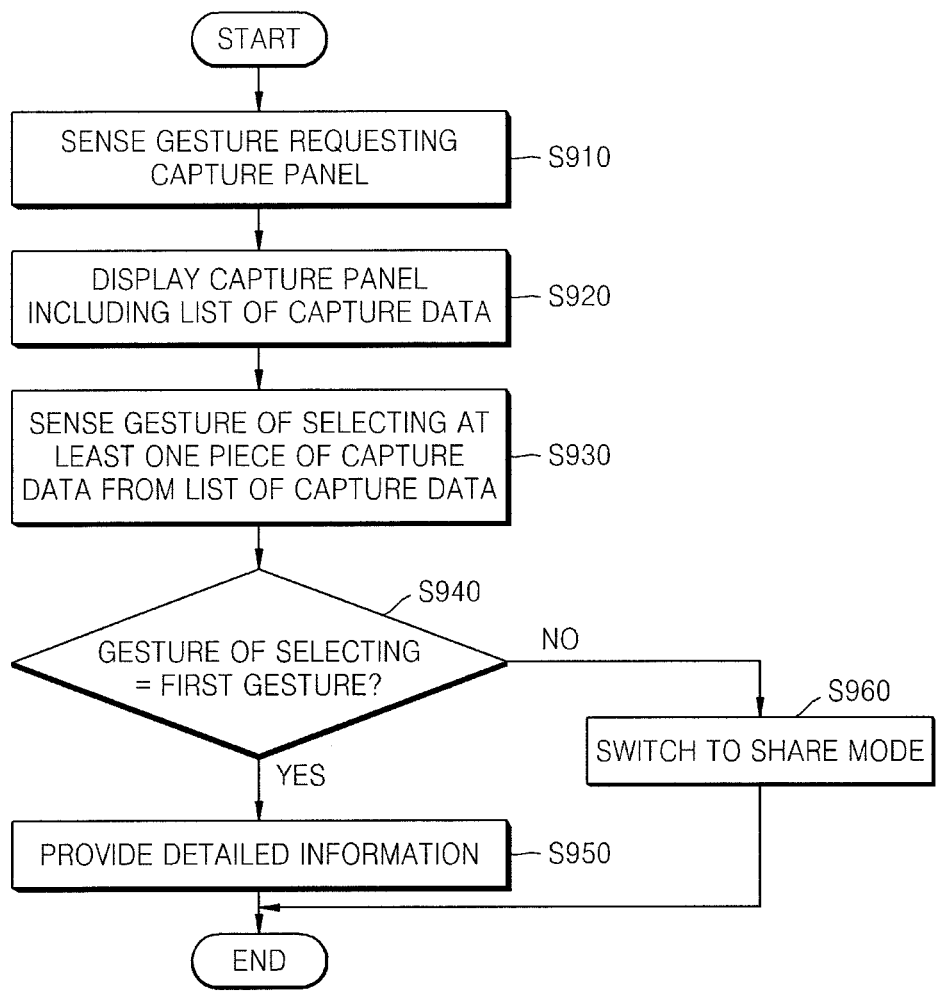
FIG. 9 is a flowchart illustrating a method of providing capture data, according to an exemplary embodiment of the present invention.

FIG. 9 is a flowchart illustrating a method of providing capture data, according to an exemplary embodiment of the present invention.

The method of FIG. 9 includes operations that are sequentially performed by the mobile terminal 100 of FIG. 1. Thus, although not described here, the above description of the mobile terminal 100 may also be applied to the method of FIG. 9.

Referring to FIG. 9, the sensing unit 110 may, in operation S910, sense a user's gesture requesting a capture panel. According to an exemplary embodiment of the present invention, the gesture requesting a capture panel means a gesture that includes a user command regarding a display in the capture panel 300. The gesture requesting a capture panel may be preset.

According to an exemplary embodiment of the present invention, the gesture requesting a capture panel may include a gesture of flicking a screen from a predetermined location in an edge region of the screen toward the inside of the screen. The edge region of the screen may include not only a border region of the screen but also a bezel region of the mobile terminal 100. In other words, according to an exemplary embodiment of the present invention, a user may request the capture panel 300 by performing flicking toward the inside of the screen from a predetermined location in the edge region or the bezel region.

According to another exemplary embodiment of the present invention, the gesture requesting a capture panel may include touching or tapping a predetermined region on the screen, and shaking the mobile terminal 100 according to a predetermined pattern.

Then, the display unit 150 may, in operation S920, display the capture panel 300 including a list of capture data on the screen, according to the sensed gesture. In other words, the display unit 150 may display the entire capture panel 300 that is partially displayed in an edge region of the screen or that is hidden, according to the sensed gesture.

According to an exemplary embodiment of the present invention, capture data may include an image and metadata corresponding to content captured using the mobile terminal 100. That is, the display unit 150 may display the capture panel 300 including a list of images and metadata corresponding to each of captured contents.

According to an exemplary embodiment of the present invention, captured content may include at least one from among a still image, a moving picture, and sound. Also, according to an exemplary embodiment of the present invention, captured content may be internal content or external content.

According to an exemplary embodiment of the present invention, the controller 180 may arrange a list of capture data included in the capture panel 300 according to a capture time. For example, capture data that has most recently been captured may be arranged in an upper region of the capture panel 300.

According to an exemplary embodiment of the present invention, the controller 180 may arrange a list of capture data included in the capture panel 300 according to content type. In other words, the controller 180 may provide a list of capture data in units of internal contents or external contents. Otherwise, the controller 180 may provide a list of capture data in units of still images, moving pictures, or sound.

According to an exemplary embodiment of the present invention, the display unit 150 may display all images included in the capture panel 300 at once according to the user's flicking gesture or may classify and display the images according to a time period that the user's flicking gesture is maintained, the intensity of flicking, or a number of times of performing flicking.

For example, the display unit 150 may display a hidden shape or cue of the capture panel 300 when a user's first flicking gesture is sensed, and may display all images included in the capture panel 300 when the user's second flicking gesture is sensed.

According to an exemplary embodiment of the present invention, when the sensing unit 110 senses a user's flicking gesture performed toward the inside of the screen from a predetermined location in an edge region of the screen to request a capture panel, the display unit 150 may display the capture panel 300 to appear from the predetermined location toward the inside of the screen, according to the user's flicking gesture.

A method of providing captured data included in a capture panel will now be described below in greater detail with reference to FIG. 10.

Figure 10:
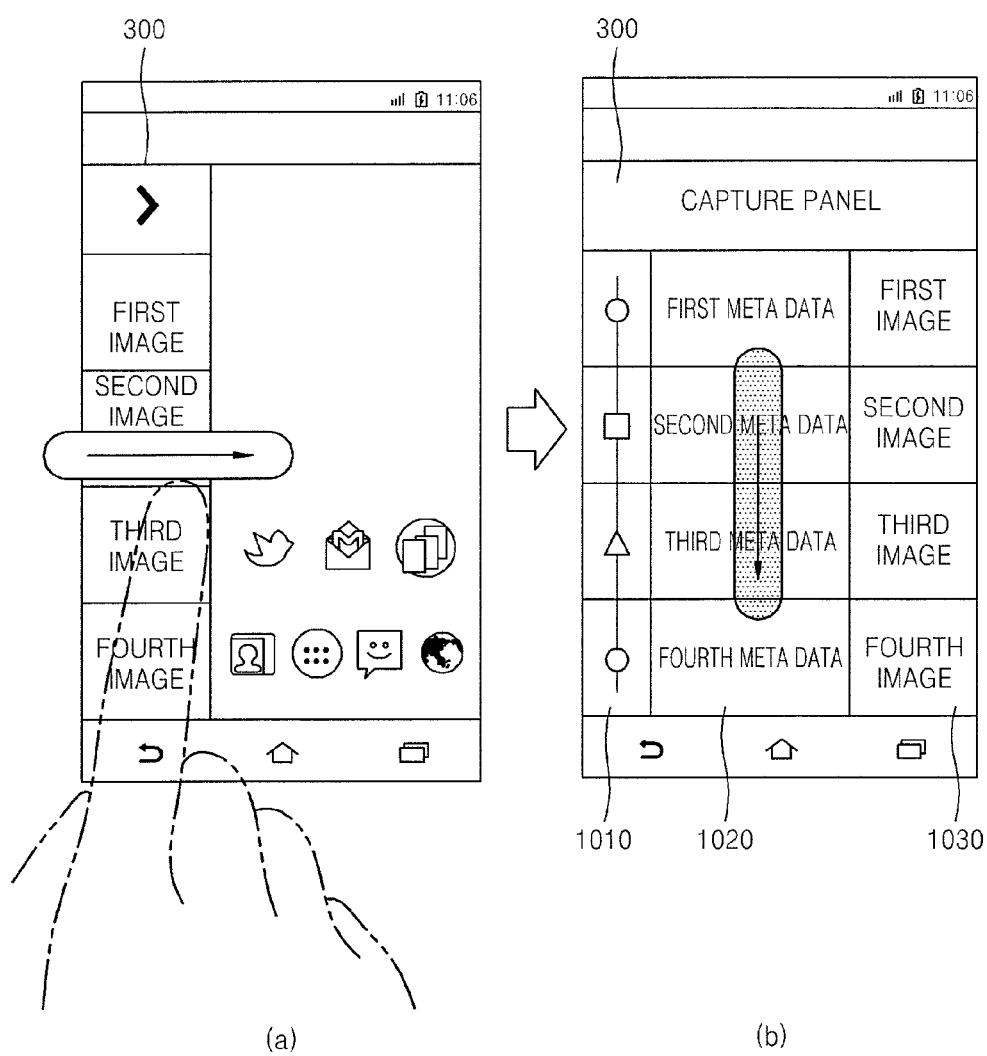
FIG. 10 is a diagram illustrating a capture panel according to an exemplary embodiment of the present invention.

FIG. 10 is a diagram illustrating a capture panel 300 according to an exemplary embodiment of the present invention.

Referring to FIGS. 1 and 10(*a*), the sensing unit 110 may sense a gesture requesting a capture panel while a home screen image is displayed or an application is executing. For example, a gesture of flicking a left bezel region on the mobile terminal 100 in a right direction may be set as the gesture requesting a capture panel. When a user flicks the left bezel region in the right direction with his/her finger, the sensing unit 110 may sense the gesture requesting a capture panel.

In this case, the display unit 150 displays the capture panel 300 on the screen according to this gesture. According to an exemplary embodiment of the present invention, when a user flicks the left bezel region in the right direction, the capture panel 300 may appear from the left bezel region in the right direction.

The gesture requesting the capture panel 300 is not limited, and examples of this gesture may include a gesture of flicking the left bezel region in the right direction, a gesture of flicking a right bezel region in a left direction, a gesture of flicking an upper bezel region downward, and a gesture of flicking a lower bezel region upward.

Referring to FIG. 10(*b*), according to an exemplary embodiment of the present invention, a list of capture data may include at least one from among an image 1030 and metadata 1020 corresponding to each of captured contents, and an icon 1010 representing the type of the content. For example, an icon of capture data related to sound content may be 'Δ', an icon of capture data related to a still image may be '□', and an icon of capture data related to a moving picture may be '○'.

According to an exemplary embodiment of the present invention, since a plurality of pieces of capture data may be included in the capture panel 300, a user may scroll the screen upward or downward or touch and drag the screen upward or downward to view the plurality of pieces of capture data stored in the capture panel 300.

The gesture requesting a capture panel may include a user's gesture requesting at least one piece of content to be captured. In other words, according to an exemplary embodiment of the present invention, even though a gesture requesting the mobile terminal 100 to capture at least one content is sensed, the display unit 150 may display the capture panel 300. For example, referring to FIG. 7, the display unit 150 may display capture data obtained according to a gesture requesting the mobile terminal 100 to capture at least one content in a first region of the screen and display the capture panel 300 to which the capture data is added in a second region of the screen. A method of capturing content according to an exemplary embodiment of the present invention has been described above with reference to FIG. 2 and thus, will not be repeated here.

Referring back to FIG. 9, the sensing unit 110 may, in operation S930, sense a gesture of selecting at least one piece of capture data from the list of capture data included in the capture panel 300. For example, a user may touch, tap, or sweep the at least one piece of capture data.

Then, the controller 180 may provide detailed information corresponding to the at least one of capture data or may switch to a share mode, according to the gesture of selecting the at least one piece of capture data in operation S940. According to an exemplary embodiment of the present invention, when the gesture of selecting the at least one piece of capture data is a first gesture, the controller 180 may, in operation S950, provide detailed information corresponding to the at least one piece of capture data, based on metadata included in the at least one piece of capture data. In this case, according to an exemplary embodiment of the present invention, the controller 180 may select an application for providing detailed information corresponding to the at least one piece of capture data, and execute the selected application.

For example, if a user selects capture data related to music content from the capture panel 300, the controller 180 may reproduce a streaming page related to the music content. If the user selects capture data related to a schedule from the capture panel 300, the controller 180 may execute a schedule application. If the user selects capture data related to movie content from the capture panel 300, the controller 180 may reproduce a movie file.

According to an exemplary embodiment of the present invention, when the gesture of selecting is a second gesture, the sensing unit 110 may, in operation S960, switch to a share mode to display a share panel for transmitting capture data to an external device. According to an exemplary embodiment of the present invention, the second gesture may be a gesture requesting a share panel. The gesture requesting a share panel means a gesture requesting the share panel 400 to be displayed so as to share data with an external device. According to an exemplary embodiment of the present invention, the gesture requesting a share panel may be preset. According to an exemplary embodiment of the present invention, the gesture requesting a share panel may be a gesture of flicking or a gesture of sweeping.

The display unit 150 may display the share panel 400 including a list of ID information of at least one external device in an edge region of the screen, according to the gesture requesting a share panel.

For example, according to an exemplary embodiment of the present invention, when a user flicks the screen toward the inside of the screen from a predetermined location in an edge region of the screen while the capture panel 300 is displayed, the display unit 150 may display the share panel 400 in an edge region of the screen.

In this case, the sensing unit 110 may sense a drag-and-drop gesture performed from a first point on the displayed capture panel 300 to a second point on the displayed share panel 400. Then, the communication unit 160 may transmit capture data corresponding to the first point to an external device corresponding to the second point, according to the drag-and-drop gesture.

According to another exemplary embodiment of the present invention, if a gesture of sweeping at least one piece of capture data included in a list of capture data included in the displayed capture panel 300 is sensed, then the controller 180 may switch to the share mode.

In other words, the display unit 150 may display capture data corresponding to the gesture of sweeping in the first region of the screen, display the share panel 400 in the second region of the screen, and display the capture panel 300 in a third region of the screen.

According to an exemplary embodiment of the present invention, the first region may be located within a predetermined distance from the center of the screen, the second region may be located at one side of the screen, and the third region may be located at another side of the screen, as will be described below in detail with reference to FIG. 11.

Figure 11:
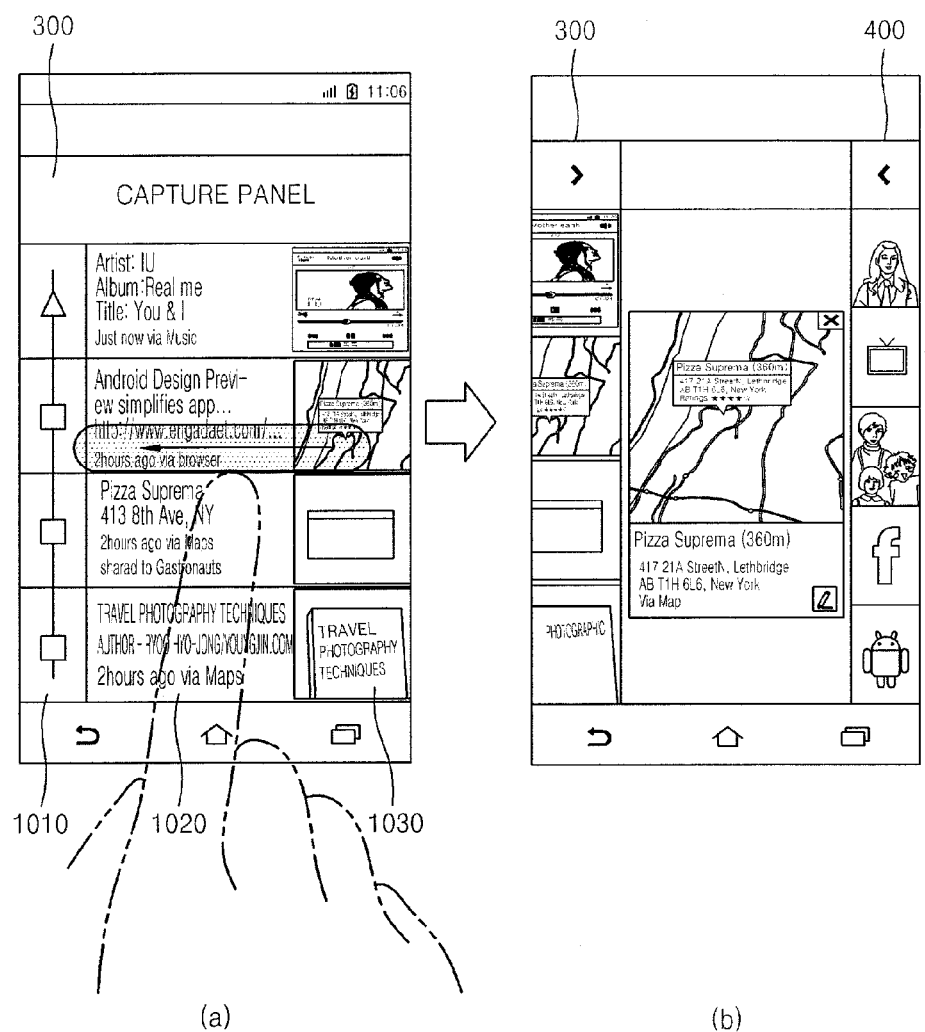
FIG. 11 is a flowchart illustrating a method of sharing capture data in a capture panel, according to an exemplary embodiment of the present invention.

FIG. 11 is a flowchart illustrating a method of sharing capture data in a capture panel, according to an exemplary embodiment of the present invention.

Referring to FIGS. 1 and 11(*a*), the display unit 150 may display a capture panel 300 including a list of capture data on the screen thereof, based on a user's gesture requesting a capture panel. The list of capture data may include at least one from among an image 1030 and metadata 1020 corresponding to each of captured contents, and an icon 1010 representing the type of the content. For example, an icon of capture data related to sound content may be 'Δ', an icon of capture data related to a still image may be '☐', and an icon of capture data related to a moving picture may be '○'.

In this case, the sensing unit 110 may sense the user's gesture of sweeping second capture data (second metadata+a second image). Here, the sweeping is a type of dragging and means moving from a first point on the screen to a second point on the screen by a user sweeping the screen with his/her finger or a touch pen without touching any object for a predetermined period of time.

Referring to FIG. 11(*b*), when a gesture of sweeping at least one piece of capture data from the list of capture data included in the capture panel 300 is sensed, the display unit 150 may display the second capture data (second metadata+ second image) corresponding to the gesture of sweeping in a central region of the screen, display the capture panel 300 on a left side of the screen, and display the share panel 400 on a right side of the screen.

According to an exemplary embodiment of the present invention, the sensing unit 110 may sense a gesture of tapping at least one piece of ID information of at least one external device in the share panel 400. In this case, the communication unit 160 may transmit the second capture data corresponding to the gesture of sweeping to the at least one external device corresponding to the gesture of tapping.

For example, when a user desires to share second capture data related to map content included in the capture panel 300 with his/her friend X, the user may display the capture panel 300 by flicking a left bezel region on the mobile terminal 100 in a right direction. Also, the user may sweep a region of the capture panel 300 displaying the second capture data related to the map content.

In this case, the display unit 150 may display the second capture data related to the map content in a central region of the screen, display the capture panel 300 at a left side of the screen, and display the share panel 400 at a right side of the screen. In this case, when the user taps ID information about the friend X included in the share panel 400, the communication unit 160 transmits the second capture data related to the map content to a device of the friend X.

A method of sharing data between the mobile terminal 100 and an external device according to an exemplary embodiment of the present invention by using the elements of the mobile terminal 100 will now be described below with reference to FIG. 12.

Figure 12:
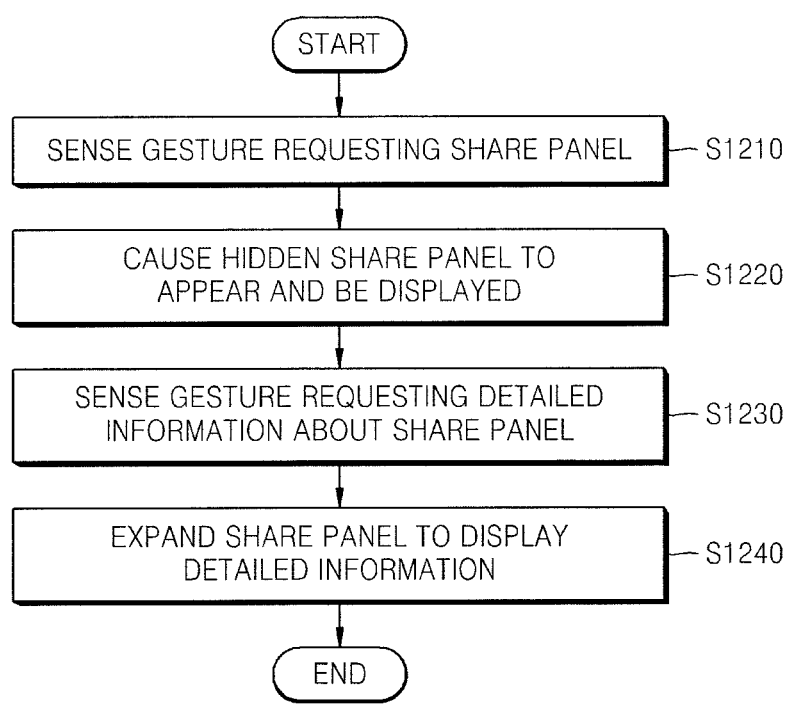
FIG. 12 is a flowchart illustrating a method of sharing data, according to an exemplary embodiment of the present invention.

FIG. 12 is a flowchart illustrating a method of sharing data, according to an exemplary embodiment of the present invention.

The method of FIG. 12 includes operations that are sequentially performed by the elements of the mobile terminal 100 of FIG. 1. Thus, although not described here, the above description of the mobile terminal 100 may also be applied to the method of FIG. 12.

Referring to FIGS. 1 and 12, the sensing unit 110 may, in operation S1210, sense a user's gesture requesting a share panel. The gesture requesting a share panel means a gesture requesting the share panel 400 of FIG. 7 or 8 to be displayed so as to share data between the mobile terminal 100 and an external device. According to an exemplary embodiment of the present invention, the gesture requesting a share panel may be preset.

According to an exemplary embodiment of the present invention, the gesture requesting a share panel may include a gesture of flicking a screen from a predetermined location in an edge region of the screen toward the inside of the screen. The edge region of the screen may include not only a border region of the screen but also a bezel region on the mobile terminal 100. In other words, according to an exemplary embodiment of the present invention, a user may request the share panel 400 by flicking the screen from the predetermined location in the edge region of the screen toward the inside of the screen with his/her finger.

According to another exemplary embodiment of the present invention, the gesture requesting a share panel may include touching or tapping a predetermined region of the screen or shaking the mobile terminal 100 according to a predetermined pattern.

The display unit 150 may, in operation S1220, cause the share panel 400, which is hidden at a side of the screen and includes a list of ID information of at least one external device, to appear and be displayed, on a side of the screen, according to the gesture requesting a share panel.

According to an exemplary embodiment of the present invention, a thumbnail image corresponding to ID information of at least one external device may be displayed in the share panel 400 in an edge region of the screen.

According to an exemplary embodiment of the present invention, the controller 180 may arrange the list of ID information of at least one external device included in the share panel 400 according to a communication time. In other words, the controller 180 may arrange the ID information of an external device that has most recently communicated with the mobile terminal 100, in an uppermost region of the share panel 400. In this case, a user may select an external device to share data, based on a list of recent communications.

According to an exemplary embodiment of the present invention, the controller 180 may arrange the list of ID information of the at least one external device included in the share panel 400 according to a number of times communication is established. In other words, the controller 180 may arrange the ID information of an external device that has most often communicated with a user, in the uppermost region of the share panel 400.

According to an exemplary embodiment of the present invention, the controller 180 may arrange the list of ID information of the at least one external device included in the share panel 400 according to the distance between the mobile terminal 100 and the at least one external device. In other words, the controller 180 may scan at least one external device near the mobile terminal 100 according to short-range wireless communication technology, e.g., Bluetooth, and then arrange the ID information of an external device most adjacent to the mobile terminal 100 in the uppermost region of the share panel 400.

According to an exemplary embodiment of the present invention, the controller 180 may recommend the ID information of an external device to share data. If a number of times that a user simultaneously transmits data to his/her friends A, B, and C is equal to or greater than a predetermined number, then the controller 180 may recommend ID information of the friends B and C by arranging the ID information of the friends B and C in the uppermost region of the share panel 400 even when the user selects only ID information of the friend A.

When a user desires to share a music content with an external device, the controller 180 may arrange ID information of friends X, Y, and Z who have shared music contents with the user a predetermined number of times or greater, in the uppermost region of the share panel 400 so as to recommend the friends X, Y, and Z as persons who will share the music content with the user.

According to an exemplary embodiment of the present invention, the share panel 400 may appear from a predetermined location on the screen toward the inside of the screen, according to a user's flicking gesture.

According to an exemplary embodiment of the present invention, the sensing unit 110 may, in operation S1230, sense a gesture requesting detailed information about the share panel 400 displayed at a side of the screen. According to an exemplary embodiment of the present invention, the gesture requesting the detailed information may include a gesture of flicking the displayed share panel 400 toward the inside of the screen.

Then, the display unit 150 may, in operation S1240, expand the share panel 400 toward the inside of the screen to display the detailed information, according to the gesture requesting the detailed information. In this case, the expanded and displayed share panel 400 may display detailed information corresponding to ID information of an external device. The detailed information corresponding to the ID information of the external device may include attribute information about the external device, information about the relationship between a user and the external device, an image identifying the external device or a user of the external device, and so on.

That is, according to an exemplary embodiment of the present invention, the display unit 150 may display the share panel 400, which simply displays a thumbnail image and the like, in an edge region of the screen when a user's first flicking gesture is sensed, and may display the share panel 400 including the detailed information corresponding to the ID information of the external device when the user's second flicking gesture is sensed.

According to an exemplary embodiment of the present invention, a user may request the share panel 400 to be displayed on the mobile terminal 100 while a home screen image is displayed or an application is executing. In other words, the sensing unit 110 may sense the user's gesture requesting the share panel 400 while an application is executing. In this case, while the application is executing, the display unit 150 may display the share panel 400 in an edge region of the screen according to this gesture.

In this case, when the user requests the application that is executing to be captured, the capturing unit 120 may capture this application and obtain capture data including an image and metadata corresponding to the application.

The sensing unit 110 may sense a first gesture of selecting ID information of at least one external device included in the displayed share panel 400.

The first gesture of selecting the ID information may be a tapping gesture, a touch-and-hold gesture, a double-tapping gesture, or a flicking gesture. In this case, the communication unit 160 may transmit shared data to the at least one external device corresponding to the first gesture of selecting the ID information. The shared data means data that a user desires to share with at least one external device. An example of the shared data may be capture data.

According to an exemplary embodiment of the present invention, ID information of an external device may include at least one from among user ID information, group ID information, server ID information, and an identifier of the external device.

According to an exemplary embodiment of the present invention, the controller 180 may select an application for transmitting shared data, based on the ID information of the at least one external device corresponding to the first gesture of selecting the ID information, and then execute the selected application. The communication unit 160 transmits the shared data to the at least one external device corresponding to the first gesture of selecting the ID information by using the application that is executing.

In other words, according to an exemplary embodiment of the present invention, when a user selects the telephone number of his/her friend as ID information of an external device, the controller 180 may execute an application that allows the user to exchange a message with the friend, chat with the friend, or make a telephone call to the friend. When the user selects an SNS server as ID information of an external device, the controller 180 may execute an application for accessing the SNS server.

When the user selects a device identifier that may be broadcast as ID information of an external device, the controller 180 may execute an application for broadcasting the device identifier. According to an exemplary embodiment of the present invention, a user may simultaneously broadcast data to a plurality of external devices near or far from the user so as to share the data. The communication unit 160 may broadcast data to an external device near the user by using short-range wireless communication technology, such as Wi-Fi direction (WFD). A method of sharing data by using a share panel will be described below in greater detail with reference to FIG. 13.

Figure 13:
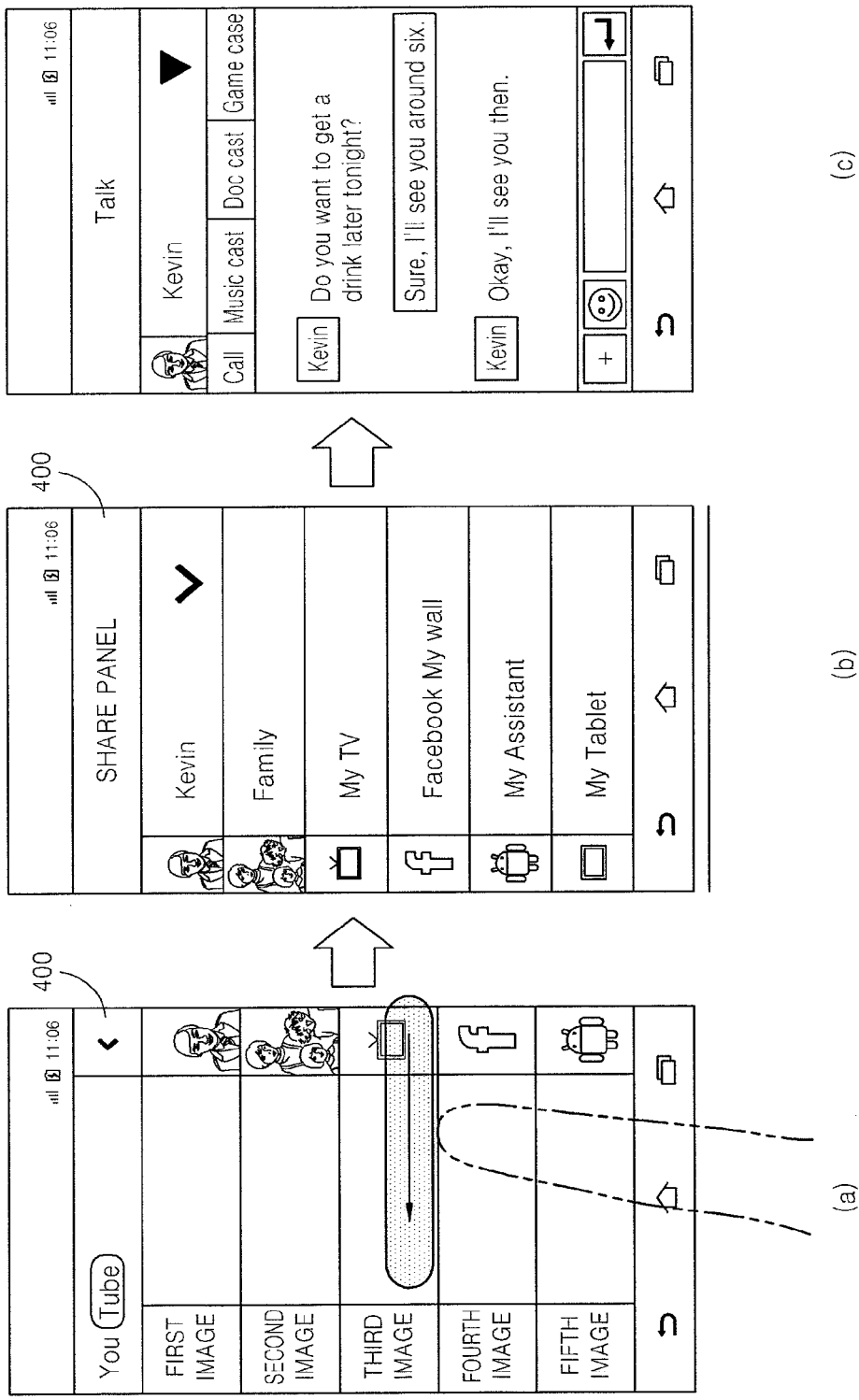
FIG. 13 is a diagram illustrating a share panel according to an exemplary embodiment of the present invention.

FIG. 13 is a diagram illustrating a share panel according to an exemplary embodiment of the present invention.

Referring to FIG. 13(*a*), according to an exemplary embodiment of the present invention, a user may flick a right bezel region on the mobile terminal 100 of FIG. 1 in a left direction while a YouTube application is executing. Then, a share panel 400 appears in a right side of the screen. The share panel 400 may include ID information of at least one external device.

Referring to FIG. 13(*b*), when the user flicks the share panel 400 displayed in the right side of the screen in the left direction once more, the share panel 400 may be expanded and displayed in the left direction. The expanded and displayed share panel 400 may include detailed information about the ID information of the at least one external device.

Referring to FIG. 13(*c*), when the user selects 'Kevin' in the share panel 400, the communication unit 160 of FIG. 1 establishes communication between Kevin's device and the mobile terminal 100. Thus, according to an exemplary embodiment of the present invention, the user may view the share panel 400 including a list of communication by making a simple gesture, and easily communicate with a user of an external device by using the share panel 400.

According to an exemplary embodiment of the present invention, the sensing unit 110 of FIG. 1 may sense a user's gesture requesting at least one content to be captured. Then, the display unit 150 of FIG. 1 may display capture data including an image and metadata related to the at least one content in a first region of the screen, and display the share panel 400 on a second region which is an edge region of the screen, according to this gesture.

According to an exemplary embodiment of the present invention, when the sensing unit 110 senses a drag-and-drop gesture performed in a direction from the first region to the second region, the controller 180 of FIG. 1 may control the communication unit 160 to transmit the capture data to an external device corresponding to a location in the second region where the dropping is performed.

According to another exemplary embodiment of the present invention, when the sensing unit 110 senses a gesture of tapping ID information of at least one external device included in the share panel 400, the controller 180 may control the communication unit 160 to transmit the capture data to the at least one external device corresponding to the gesture of tapping, as will be described below in detail with reference to FIG. 14.

Figure 14:
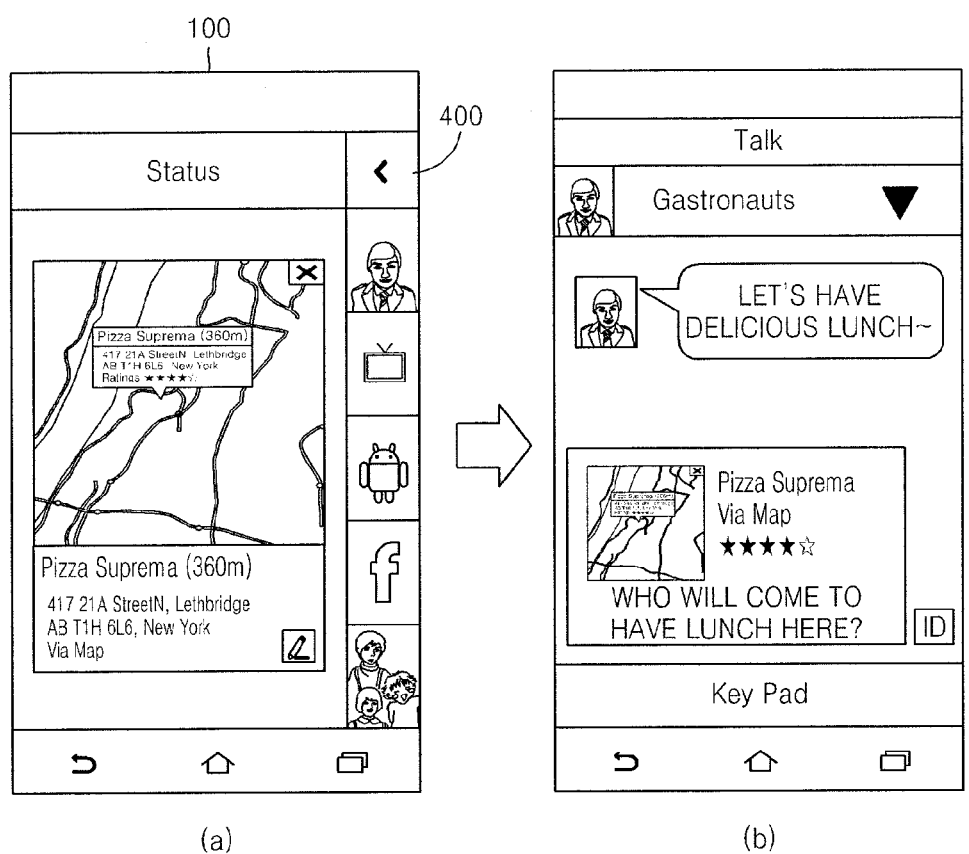
FIG. 14 is a diagram illustrating a method of communicating with an external device by using a share panel, according to an exemplary embodiment of the present invention.

FIG. 14 is a diagram illustrating a method of communicating with an external device by using a share panel, according to an exemplary embodiment of the present invention.

Referring to FIGS. 1 and 14(a), according to an exemplary embodiment of the present invention, a user may press a capture key to capture a map image displayed on a screen of the display unit 150. In this case, the sensing unit 110 senses the user's gesture requesting the mobile terminal 100 to capture at least one content. The gesture requesting the mobile terminal 100 to capture at least one content has been described above and thus, will not be repeated here.

Then, the display unit 150 may display capture data including the captured map image and metadata related to the map image, according to the gesture requesting the mobile terminal 100 to capture at least one content. Also, the display unit 150 may display a share panel 400 in an edge region of the screen, together with the capture data.

In this case, the user may drag the capture data to ID information about an external device included in the share panel 400. For example, when the user drags the capture data to the user's friend Gastronauts, the capture data may be transmitted to a device of the friend Gastronauts.

Referring to FIG. 14(b), the controller 180 may execute a message program to allow the user to chat with the friend Gastronauts, according to the user's drag-and-drop gesture. In other words, according to an exemplary embodiment of the present invention, the user may capture and share capture data with another person in a simple manner.

According to an exemplary embodiment of the present invention, while the share panel 400 is displayed in the edge region of the screen, the sensing unit 110 may sense the user's gesture requesting a capture panel.

In this case, the display unit 150 may display a capture panel 300 including a list of capture data in another edge region of the screen, according to the gesture requesting a capture panel.

According to an exemplary embodiment of the present invention, the gesture requesting a share panel may include a gesture of flicking a first point in a bezel region on the mobile terminal 100 in a first direction, and the gesture requesting a capture panel may include a gesture of flicking a second point in the bezel region in a second direction.

In this case, the share panel 400 may appear from the first point on the bezel region in the first direction when the gesture requesting a share panel is sensed, and the capture panel 300 may appear from the second point in the bezel region in the second direction when the gesture requesting a capture panel is sensed.

For example, the capture panel 300 may appear from a left bezel region in a right direction and may then be displayed in a left side of the screen. The share panel 400 may appear from a right bezel region in a left direction and may then be displayed in a right side of the screen.

In this case, the sensing unit 110 may sense a first gesture of selecting ID information of at least one external device included in the share panel 400, and a second gesture of selecting at least one piece of capture data included in the capture panel 300.

Then, the communication unit 160 may transmit the at least one piece of capture data corresponding to the second gesture of selecting the at least one piece of capture data to the at least one external device corresponding to the first gesture of selecting the ID information.

According to an exemplary embodiment of the present invention, when the sensing unit 110 senses a user's gesture requesting at least one content to be captured, the display unit 150 may display capture data including an image and metadata related to the at least one content in a first region of the screen, display the share panel 400 in a second region of the screen, and display the capture panel 300 to which the capture data is added in a third region on the screen, according to this gesture.

According to an exemplary embodiment of the present invention, the first region may be located within a predetermined distance from a center of the screen, the second region may be located at one side of the screen, and the third region may be located at another side of the screen, as described above with reference to FIG. 7.

Figure 15:
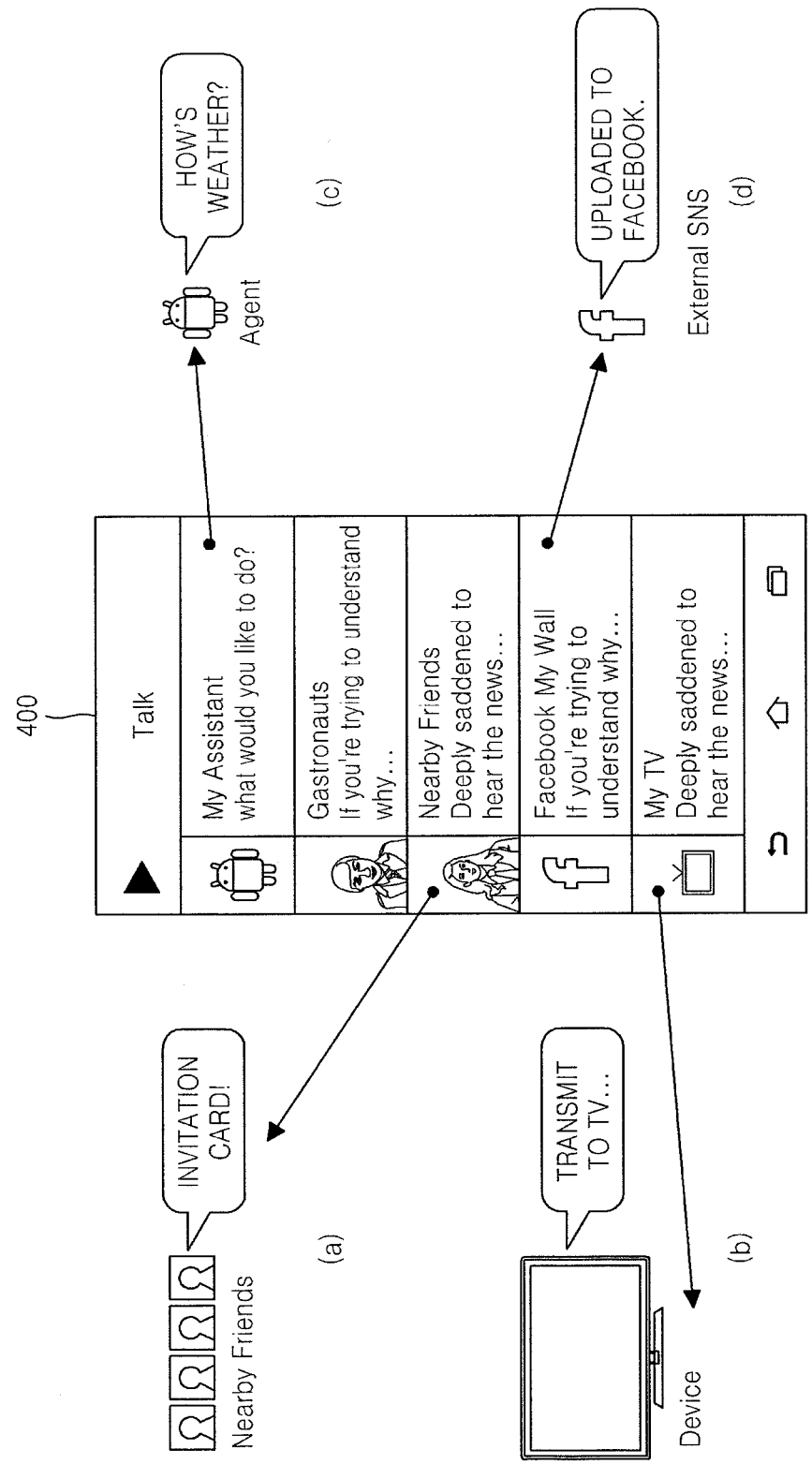
FIG. 15 is a diagram illustrating a method of communicating with various external devices by using a share panel, according to an exemplary embodiment of the present invention.

FIG. 15 is a diagram illustrating a method of communicating with various external devices by using a share panel, according to an exemplary embodiment of the present invention.

Referring to FIG. 15(a), according to an exemplary embodiment of the present invention, a user may select a plurality of users from a share panel 400 to send an invitation card to his/her friends. In this case, the communication unit 160 transmits the invitation card to devices of the plurality of users.

In other words, according to an exemplary embodiment of the present invention, the user may chat with, exchange messages with, make a call to, or broadcast data to a user or a group of users from among the plurality of users included in the share panel 400.

According to an exemplary embodiment of the present invention, as illustrated in FIG. 15(b), a user may transmit shared data to another device, e.g., a TV or a tablet PC, which belongs to the user by using the share panel 400.

Referring to FIG. 15(c), the user may also chat with or make a call to an agent server by selecting ID information about the agent server included in the share panel 400.

Referring to FIG. 15(d), the user may transmit data, which is to be shared, to an SNS server, e.g., Facebook, by using the share panel 400 in a simple manner.

A method of transmitting information to a user according to an exemplary embodiment of the present invention will now be described below in detail with reference to FIG. 16.

Figure 16:
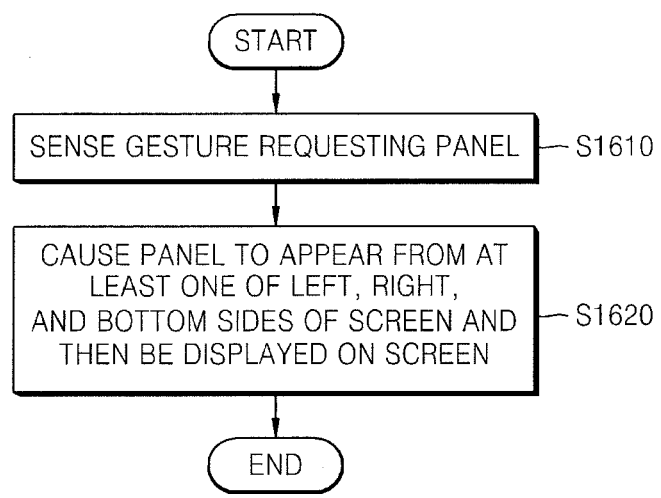
FIG. 16 is a flowchart illustrating a method of providing information, according to an exemplary embodiment of the present invention.

FIG. 16 is a flowchart illustrating a method of providing information, according to an exemplary embodiment of the present invention.

Referring to FIGS. 1 and 16, the sensing unit 110 may, in operation S1610, sense a user's gesture requesting a panel. According to an exemplary embodiment of the present invention, examples of the gesture requesting a panel may include a gesture requesting a share panel, a gesture requesting a capture panel, and a gesture requesting a recommending panel. The recommending panel means a region in which contents recommended to the user are displayed. The recommending panel will be described in greater detail with reference to FIG. 18 below.

Then, according to an exemplary embodiment of the present invention, the display unit 150 may, in operation S1620, cause the panel to appear from at least one of left, right, and bottom sides of a screen thereof and then be displayed on the screen, according to the gesture requesting a panel. In other words, according to an exemplary embodiment of the present invention, the display unit 150 displays a panel, which is hidden at a side of the screen, on the screen, according to the gesture requesting a panel.

According to an exemplary embodiment of the present invention, the panel may include at least one from among a share panel including a list of ID information of at least one external device, a capture panel including a list of capture data, and a recommending panel including contents to be recommended.

According to an exemplary embodiment of the present invention, the sensing unit 110 may sense a gesture of tapping a predetermined region of the screen a predetermined number of times or greater, as the gesture requesting a panel. Furthermore, the sensing unit 110 may recognize and sense a preset syllable or word as the gesture requesting a panel.

Figure 17:
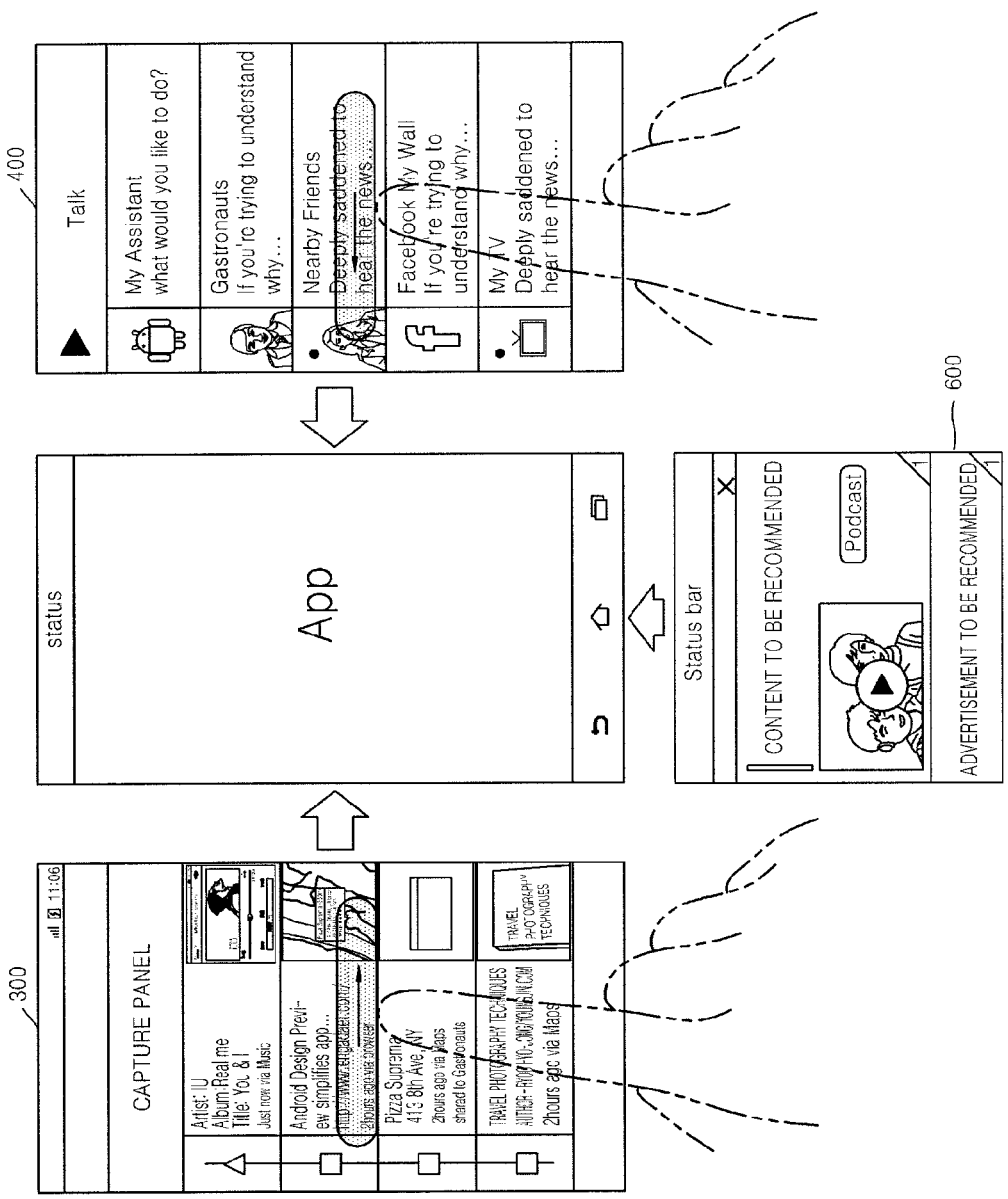
FIG. 17 is a diagram illustrating a share panel, a capture panel, and a recommending panel, according to an exemplary embodiment of the present invention.

FIG. 17 is a diagram illustrating a share panel, a capture panel, and a recommending panel, according to an exemplary embodiment of the present invention.

Referring to FIG. 17, at least one from among the capture panel 300, the share panel 400, and the recommending panel 600 may be displayed according to a user's gesture requesting a panel. For example, the capture panel 300 may be displayed when the user flicks a left bezel region in a right direction, the share panel 400 may be displayed when the user flicks a right bezel region in a left direction, and the recommending panel 600 may be displayed when the user performs double-tapping a lower part of the mobile terminal 100.

According to an exemplary embodiment of the present invention, each of hidden panels may appear from one side of the screen and then be displayed on the screen, according to the user's simple gesture.

A method of providing a user with information by using a recommending panel will now be described below in detail with reference to FIG. 18.

FIG. 18 is a flowchart illustrating a method of providing information by using a recommending panel, according to an exemplary embodiment of the present invention.

The method of FIG. 18 includes operations that are sequentially performed by the elements of the mobile terminal 100 of FIG. 1. Thus, although not described here, the above description of the mobile terminal 100 may also be applied to the method of FIG. 18.

Referring to FIGS. 1 and 18, according to an exemplary embodiment of the present invention, the sensing unit 110 may, in operation S1810, sense a gesture requesting content recommendation. The gesture requesting content recommendation means a gesture requesting recommended content to be displayed. According to an exemplary embodiment of the present invention, the gesture requesting content recommendation may be preset. According to an exemplary embodiment of the present invention, the gesture requesting content recommendation may include a gesture requesting a recommending panel.

According to an exemplary embodiment of the present invention, the gesture requesting content recommendation may include a gesture of tapping a predetermined region on the mobile terminal 100 a predetermined number of times or greater. That is, the sensing unit 110 may sense a gesture of tapping the predetermined region on the mobile terminal 100 the predetermined number of times or greater as the gesture requesting content recommendation.

For example, when a user double-taps a bezel region on the mobile terminal 100 so as to be recommended content, the sensing unit 110 senses the user's gesture of double-tapping as the gesture requesting content recommendation.

According to another exemplary embodiment of the present invention, the gesture requesting content recommendation may include a gesture of flicking a predetermined region on a screen toward the inside of the screen. For example, when the user flicks a predetermined location in a lower bezel region upward, the sensing unit 110 may determine that the gesture requesting content recommendation occurs. According to an exemplary embodiment of the present invention, the gesture requesting content recommendation may include a gesture of shaking the mobile terminal 100 a predetermined number of times or greater.

According to an exemplary embodiment of the present invention, the sensing unit 110 may sense a pause in the user's voice for a predetermined time or longer during voice recognition. In this case, the sensing unit 110 may recognize the pause in the user's voice as the gesture requesting content recommendation.

According to an exemplary embodiment of the present invention, the sensing unit 110 may recognize and analyze the user's voice to sense a preset word or syllable requesting content recommendation. According to an exemplary embodiment of the present invention, the preset word requesting content recommendation may be a word that the user has frequently used when he or she hesitates to speak or is thinking. For example, the preset word may be 'um', 'well', or the like.

The preset word requesting content recommendation content may be set by the user or may be automatically set by analyzing the user's language pattern by using the controller 180.

Then, according to an exemplary embodiment of the present invention, the recommending unit 170 may, in operation S1820, determine content to be recommended, based on capture data including an image and metadata corresponding to content captured by the user.

In general, the user captures an object (content) which he or she is interested in, and capture data according to an exemplary embodiment of the present invention includes not only an image corresponding to the captured object but also metadata corresponding to the captured object. Thus, when content that is to be recommended is determined based on the capture data, the user may be recommended content that is optimal to the user.

According to an exemplary embodiment of the present invention, examples of the capture data may include capture data corresponding to internal content reproduced inside the mobile terminal 100, and capture data corresponding to external content present outside the mobile terminal 100.

According to an exemplary embodiment of the present invention, the recommending unit 170 may determine content to be recommended, in consideration of at least one from among usage pattern information about the mobile terminal 100, the user's profile information, the user's life pattern information, and situational information when the gesture requesting content recommendation is sensed.

The usage pattern information about the mobile terminal 100 may include a communication time, communication details, the contents of messages exchanged, a schedule, a type of a preferred application, a record of visiting a web site, stored music file information, and the user's preference for, for example, places, a music genre, contents, movies, friends, games, and bookmarked contents.

The user's life pattern information may include information related to the user's life pattern, e.g., meals, residence, exercises, work, relaxation time, and sleep cycle. The user's profile information may include the user's age, sex, occupation, and educational background.

According to an exemplary embodiment of the present invention, the situational information means information collected by or near the mobile terminal 100 when the gesture requesting content recommendation is sensed. According to an exemplary embodiment of the present invention, the situational information may include content that is being reproduced when the gesture requesting content recommendation is sensed, location information of the mobile terminal 100 when the gesture requesting content recommendation is sensed, time information when the gesture requesting content recommendation is sensed, and weather information when the gesture requesting content recommendation is sensed.

Then, according to an exemplary embodiment of the present invention, the display unit 150 may, in operation S1830, display a recommending panel including the recommended content on the screen. In this case, according to an exemplary embodiment of the present invention, the recommending panel may appear upward from the lower bezel region.

According to an exemplary embodiment of the present invention, the display unit 150 may also display a recommended advertisement. The recommending unit 170 may extract a recommended advertisement, in consideration of the situational information, e.g., the location of the mobile terminal 100, time, date, and weather, the capture data, and user log data, as will be described below in detail with reference to FIG. 19.

FIG. 19 is a diagram illustrating a gesture requesting content recommendation, according to an exemplary embodiment of the present invention.

Referring to FIGS. 1 and 19(a), according to an exemplary embodiment of the present invention, a user may double-tap a lower part of the mobile terminal 100 to be recommended content. In this case, the sensing unit 110 may sense the user's double-tapping gesture as a gesture requesting content recommendation.

When the gesture requesting content recommendation is sensed, the recommending unit 170 determines content to be recommended, based on capture data. For example, it is assumed that the user reproduces music of an artist A in the capture panel 300 of FIG. 17 at least five times per week, capture data about music files of the artist A occupies more than 20% of the entire capture data, and the music files of the artist A occupy 80% of contents that the user has captured in a park. In this case, when the user taps the lower part of the mobile terminal 100 in the park, the recommending unit 170 may select content related to music of the artist A as content that is to be recommended.

As another example, the user may double-tap a bezel region on the mobile terminal 100 when a folder including 2010' family travel photos is displayed. In this case, the recommending unit 170 may select a 2011' Jeju-do family travel photo folder related to the displayed photo content as content that is to be recommended.

According to an exemplary embodiment of the present invention, when during voice recognition, the user says 'um (or well)' and temporarily stops speaking since he or she did not know what to say, the sensing unit 110 may recognize either a time period that the voice recognition is stopped or the word 'um (or well)'.

In this case, if the time period that the voice recognition is stopped exceeds a predetermined time, the sensing unit 110 may sense absence of the user's voice as the gesture requesting content recommendation. If the word 'um (or well)' is preset as a word requesting content recommendation, the sensing unit 110 may determine the word 'um (or well)' sensed during the voice recognition as the gesture requesting content recommendation.

Since the gesture requesting content recommendation is sensed, the recommending unit 170 selects content to be recommended. In this case, the recommending unit 170 may further consider information about the user's usual language habits to predict a word that the user will say, and select content to be recommended, based on the predicted word.

The content that is to be recommended may include capture data including an image and metadata regarding captured content.

Referring to FIG. 19(b), the display unit 150 may display a recommending panel including recommended content 1910. According to an exemplary embodiment of the present invention, the display unit 150 may further display a recommended advertisement 1920.

In this case, the sensing unit 110 may sense the user's selection about the displayed recommended content. Then, the controller 180 controls the selected recommended content to be reproduced. For example, when the recommended content 1910 displayed in the recommending panel is an image related to music content, the user may reproduce the music content by touching or tapping the image related to the displayed music content.

Figure 20:
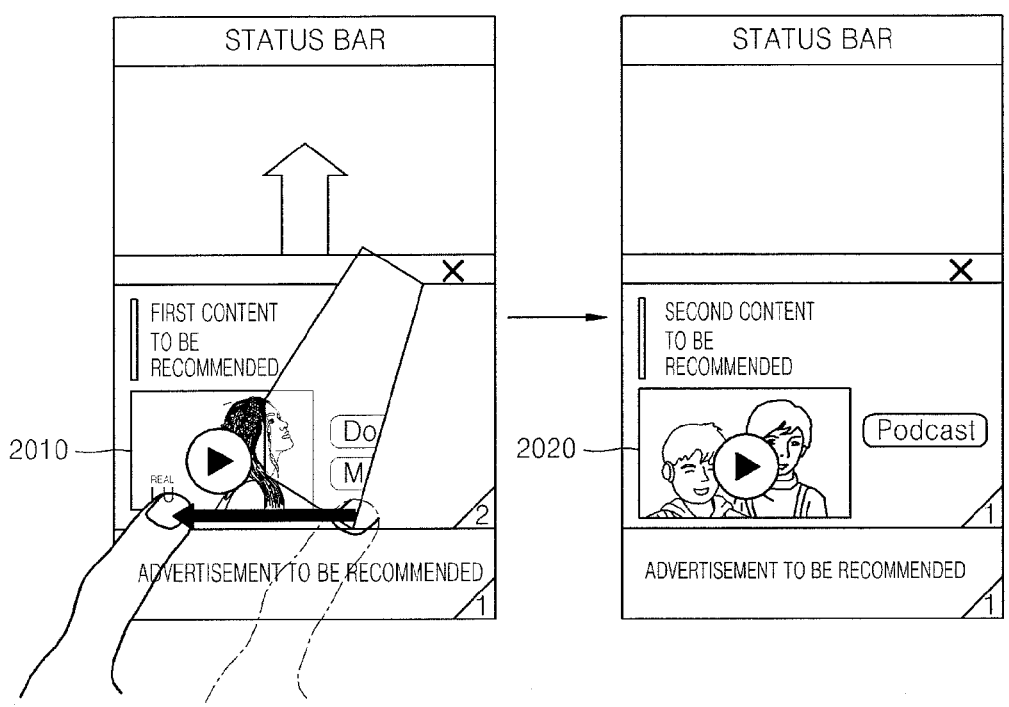
FIG. 20 is a diagram illustrating a method of displaying recommended data, according to an exemplary embodiment of the present invention.

FIG. 20 is a diagram illustrating a method of displaying recommended data, according to an exemplary embodiment of the present invention.

According to an exemplary embodiment of the present invention, the recommending unit 170 may determine a plurality of contents to be recommended. In this case, according to an exemplary embodiment of the present invention, the display unit 150 of FIG. 1 displays the plurality of recommended contents.

According to an exemplary embodiment of the present invention, the display unit 150 may simultaneously display the plurality of recommended contents in a recommending panel, or may sequentially display the plurality of recommended contents in the recommending panel according to a user's gesture.

For example, when the recommending unit 170 determines first content to be recommended 2010 and a second content to be recommended 2020, the display unit 150 may first display the first content to be recommended 2010 in the recommending panel. Then, when the sensing unit 110 senses a gesture of flicking from a first point on the recommending panel to a second point thereon, the display unit 150 may switch from the first content to be recommended 2010 to the second content to be recommended 2020 to display the second content to be recommended 2020 in the recommending panel, based on the gesture of flicking.

In other words, the user may view the plurality of recommended contents by simply making a gesture of turning pages of a book. The user may tap desired content to be reproduced while viewing the plurality of recommended contents. In this case, the controller 180 controls the recommended content corresponding to the gesture of tapping. Information about the recommended content that the user selects may be recorded in a user log.

The above exemplary embodiments of the present invention may be embodied as program commands and may be stored in a non-transitory computer readable recording medium. The non-transitory computer readable recording medium may store program commands, data files, data structures, or a combination thereof. Program commands that may be stored in the non-transitory computer readable recording medium may be specially designed and constructed for aspects of the present invention or may be well known to those in the computer software field to which the present invention pertains. Examples of the non-transitory computer readable medium are a magnetic recording medium, e.g., a hard disc, a floppy disc, a magnetic tape, etc.; an optical recording medium, e.g., a Compact Disc (CD)-Read Only Memory (ROM), a Digital Versatile Disc (DVD), etc.; a magneto-optical medium, e.g., a floptical disk; and a hardware device, e.g., a ROM, a Random Access Memory (RAM), a flash memory, which is constructed to store and execute program commands. Examples of a program command include mechanical language code that may be made, for example, by using a compiler, and high-level language code that may be executed in a computer, for example, by using an interpreter.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing information, performed by a mobile terminal, the method comprising:
   obtaining one or more captured contents and capture data including an image and metadata corresponding to the one or more captured contents;
   determining contents to be recommended in consideration of accumulated personal information and the capture data;
   sensing a user's gesture requesting a panel; and
   causing the panel to appear from at least one from among a left side, a right side, and a bottom side of a screen and then displaying the panel on the screen, according to the user's gesture requesting the panel,
   wherein the panel comprises:
      a share panel including a list of identification information of one or more external devices; and
      a recommending panel including the contents to be recommended.

2. The method of claim 1, wherein the sensing of the user's gesture requesting the panel comprises sensing a gesture of tapping a predetermined region of the screen a predetermined number of times or recognizing a preset syllable.

3. The method of claim 1,
   wherein the sensing of the user's gesture requesting the panel comprises sensing a user's gesture requesting content recommendation, and
   wherein the displaying of the panel comprises:
      displaying the recommending panel including the contents to be recommended on the screen.

4. The method of claim 1, wherein the capture data comprises:
   capture data corresponding to internal content to be reproduced in the mobile terminal; and
   capture data corresponding to external content from outside the mobile terminal.

5. The method of claim 1, wherein the accumulated personal information comprise at least one from among usage pattern information about the mobile terminal, and the user's profile information, the user's life pattern information.

6. The method of claim 3, wherein the sensing of the user's gesture requesting content recommendation comprises sensing a user's gesture of tapping a predetermined region of the mobile terminal a predetermined number of times.

7. The method of claim 3, wherein the sensing of the user's gesture requesting content recommendation comprises:
   recognizing the user's voice; and
   when the user's voice is paused for a predetermined time period while the user's voice is recognized, the pause is sensed as the user's gesture requesting content recommendation.

8. The method of claim 3, wherein the sensing of the user's gesture requesting content recommendation comprises:
   recognizing the user's voice; and
   sensing a word requesting content recommendation from among words included in the user's recognized voice.

9. The method of claim 3, wherein the sensing of the user's gesture requesting content recommendation comprises a user's gesture of flicking the screen toward the inside of the screen from at least one from among the left side, the right side, and the bottom side of the screen.

10. The method of claim 5, wherein the situational information comprises at least one from among information about content that is being reproduced when the user's gesture requesting content recommendation is sensed, location information of the mobile terminal when the user's gesture requesting content recommendation is sensed, time information when the user's gesture requesting content recommendation is sensed, and weather information when the user's gesture requesting content recommendation is sensed.

11. The method of claim 3, wherein the recommending panel appears upward from the bottom side of the screen.

12. The method of claim 3, wherein the displaying the recommending panel including the contents to be recommended on the screen comprises:
   displaying first content to be recommended in the recommending panel;
   sensing a gesture of flicking the recommending panel from a first point on the recommending panel to a second point on the recommending panel; and
   switching the first content to be recommended to second content to be recommended and displaying the second content to be recommended in the recommending panel, based on the gesture of the flicking.

13. The method of claim 3, further comprising:
sensing a user's selection of the contents to be recommended included in the recommending panel; and
reproducing the contents to be recommended corresponding to the user's selection.

14. A mobile terminal comprising:
a capturing unit configured to obtain one or more captured contents and capture data including an image and metadata corresponding to the one or more captured contents;
a recommending unit configured to determine contents to be recommended in consideration of accumulated personal information and the capture data;
a sensing unit configured to sense a user's gesture requesting a panel;
a display unit configured to:
cause the panel to appear from at least one from among a left side, a right side, and a bottom side of a screen, and
display the panel on the screen, according to the user's gesture requesting the panel; and
a controller configured to control the sensing unit and the display unit,
wherein the panel comprises:
a share panel including a list of identification information of one or more external devices; and
a recommending panel including the contents to be recommended.

15. The mobile terminal of claim 14, wherein the sensing unit senses a gesture of tapping a predetermined region of the screen a predetermined number of times or recognizing a preset syllable.

16. The mobile terminal of claim 14,
wherein the sensing unit senses a user's gesture requesting content recommendation, and
wherein the display unit displays the recommending panel including the contents to be recommended on the screen.

17. The mobile terminal of claim 14, wherein the capture data comprises:
capture data corresponding to internal content to be reproduced in the mobile terminal; and
capture data corresponding to external content from outside the mobile terminal.

18. The mobile terminal of claim 14, wherein the accumulated personal information comprise at least one from among usage pattern information about the mobile terminal, and the user's profile information, the user's life pattern information.

19. The mobile terminal of claim 16, wherein the user's gesture requesting content recommendation comprises a user's gesture of tapping a predetermined region of the mobile terminal a predetermined number of times.

20. The mobile terminal of claim 16, wherein the sensing unit recognizes the user's voice, and senses a pause in the user's voice as the user's gesture requesting content recommendation when the user's voice is paused for a predetermined time period while the user's voice is recognized.

21. The mobile terminal of claim 16, wherein the sensing unit recognizes the user's voice, and senses a word requesting content recommendation from among words included in the user's recognized voice.

22. The mobile terminal of claim 16, wherein the user's gesture requesting content recommendation comprises a user's gesture of flicking the screen toward the inside of the screen from at least one from among the left side, the right side, and the bottom side of the screen.

23. The mobile terminal of claim 18, wherein the situational information comprises at least one from among information about content that is being reproduced when the user's gesture requesting content recommendation is sensed, location information of the mobile terminal when the user's gesture requesting content recommendation is sensed, time information when the user's gesture requesting content recommendation is sensed, and weather information when the user's gesture requesting content recommendation is sensed.

24. The mobile terminal of claim 14, wherein the recommending panel appears upward from the bottom side of the screen.

25. The mobile terminal of claim 16,
wherein the sensing unit senses a gesture of flicking the recommending panel displaying first content to be recommended from a first point on the recommending panel to a second point on the recommending panel, and
wherein the display unit switches the first content to be recommended to second content to be recommended and displays the second content to be recommended in the recommending panel, based on the gesture of the flicking.

26. The mobile terminal of claim 16,
wherein the sensing unit senses a user's selection of the contents to be recommended included in the recommending panel, and
wherein the controller reproduces the contents to be recommended corresponding to the user's selection.

27. A non-transitory computer readable recording medium having recorded thereon a computer program for executing the method of claim 1.

* * * * *